US009277067B2

(12) United States Patent
Faust

(10) Patent No.: US 9,277,067 B2
(45) Date of Patent: Mar. 1, 2016

(54) SYSTEM, APPARATUS AND METHOD FOR ENHANCING SCAN FUNCTIONALITY

(71) Applicant: Dennis Faust, Downingtown, PA (US)

(72) Inventor: Dennis Faust, Downingtown, PA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/164,069

(22) Filed: Jan. 24, 2014

(65) Prior Publication Data

US 2015/0215481 A1 Jul. 30, 2015

(51) Int. Cl.
H04N 1/00 (2006.01)
H04N 1/04 (2006.01)
H04N 1/107 (2006.01)
H04N 1/32 (2006.01)
G06F 3/12 (2006.01)
G06K 15/02 (2006.01)

(52) U.S. Cl.
CPC ....... H04N 1/00225 (2013.01); H04N 1/32122 (2013.01); H04N 2201/0094 (2013.01); H04N 2201/3276 (2013.01)

(58) Field of Classification Search
None
See application file for complete search history.

(56) References Cited

U.S. PATENT DOCUMENTS

| 5,606,429 | A | * | 2/1997 | Sheldon et al. | 358/450 |
|---|---|---|---|---|---|
| 5,794,099 | A | * | 8/1998 | Sheldon et al. | 399/82 |
| 6,285,842 | B1 | * | 9/2001 | Katamoto et al. | 399/81 |
| 2001/0050783 | A1 | * | 12/2001 | Sato | H04N 1/00957 358/1.15 |
| 2002/0051241 | A1 | * | 5/2002 | Ogino | 358/474 |
| 2002/0138583 | A1 | * | 9/2002 | Takayama | 709/206 |
| 2002/0140960 | A1 | * | 10/2002 | Ishikawa | 358/1.13 |
| 2003/0214684 | A1 | * | 11/2003 | Kuboki | 358/474 |
| 2004/0148274 | A1 | * | 7/2004 | Warnock et al. | 707/2 |
| 2005/0174592 | A1 | * | 8/2005 | Iinuma et al. | 358/1.13 |
| 2007/0046976 | A1 | * | 3/2007 | Kasatani | 358/1.14 |
| 2007/0133050 | A1 | * | 6/2007 | Kitada et al. | 358/1.15 |
| 2008/0148370 | A1 | * | 6/2008 | Allwright | 726/5 |
| 2009/0237718 | A1 | * | 9/2009 | Hiro | 358/1.15 |
| 2009/0271429 | A1 | * | 10/2009 | Sato et al. | 707/102 |
| 2010/0033760 | A1 | * | 2/2010 | Kimura | 358/1.15 |
| 2011/0019216 | A1 | * | 1/2011 | Kataoka et al. | 358/1.13 |
| 2011/0069356 | A1 | * | 3/2011 | Yoshida | 358/442 |
| 2011/0072058 | A1 | * | 3/2011 | Tang et al. | 707/823 |
| 2012/0327482 | A1 | * | 12/2012 | Takishima | H04N 1/32037 358/402 |

FOREIGN PATENT DOCUMENTS

JP 10-173908 * 6/1998 ............. H04N 1/387

OTHER PUBLICATIONS

U.S. Appl. No. 14/164,091, Dennis Faust, filed Jan. 24, 2014.

* cited by examiner

Primary Examiner — Beniyam Menberu
(74) Attorney, Agent, or Firm — Cooper & Dunham LLP

(57) ABSTRACT

Systems, apparatuses and methods are provided to allow a multi-functional apparatus to control a mixed mode scan job build. Different types of sheets of documents with various configurations can be combined into a single output document with the various configurations intact.

25 Claims, 31 Drawing Sheets

Please Input Your Account Information

Username

HGAUSS

Password

************

Login Using ID Card | Next

Account:
HGAUSS

User:
Heinrich Gauss

Mode:
Scan/Mix Mode

Job:
Scan Job 1
(3 docs)

Log out

Summary of Scan Job 1

|  | Report (1) | Photos (2) | Data (3) |
|---|---|---|---|
| Orientation: | Portrait | Landsc. | Portrait |
| N-Up: | 2-Up | None | None |
| 2-sided: | 2-sided (T) | 1-sided | 1-sided |
| Size: | 8.5 x 11 | A4 | 8.5 x 11 |
| Resolution: | 300 DPI | 700 DPI | 500 DPI |
| Color: | B & W | Color | Grayscale |
| File Type: | PDF | PDF | PDF |
| Contrast: | ▨ | ☐ | ■ |
|  | Delete? | Delete? | Delete? |

⇐ Cancel    Add More Docs?    Edit Names    End Build ⇒

Docs in Scan Job 1

| No. | Pages |
|---|---|
| 1 | 23 |
| 2 | 16 |
| 3 | 11 |

Total: 50

Account:
HGAUSS

User:
Heinrich Gauss

Mode:
Scan/Mix Mode

Job:
Scan Job 1
(3 docs)

Log out

Are You Sure You Want To Delete Photos (Doc 2)?

Yes    No

⇐ Cancel

Docs in Scan Job 1

| No. | Pages |
|---|---|
| 1 | 23 |
| 2 | 16 |
| 3 | 11 |

Total: 50

Fig. 8N

| | Summary of Scan Job 1 | | | |
|---|---|---|---|---|
| Account: HGAUSS | | Report (1) | Data (3) | Docs in Scan Job 1 |
| User: Heinrich Gauss | Orientation: | Portrait | Portrait | No.  Pages |
| | N-Up: | 2-Up | None | 1     23 |
| Mode: Scan/Mix Mode | 2-sided: | 2-sided (T) | 1-sided | 3     11 |
| | Size: | 8.5 x 11 | 8.5 x 11 | |
| | Resolution: | 300 DPI | 500 DPI | |
| Job: Scan Job 1 (2 docs) | Color | Color | Grayscale | |
| | File Type: | PDF | PDF | Total:  34 |
| | Contrast: | ▧ | ■ | |
| | | Delete? | Delete? | |
| Log out | ⇐ Cancel | Add More Docs? | Edit Names | End Build ⇒ |

Fig. 8O

| | Where Would You Like To Insert Doc 4? | | |
|---|---|---|---|
| Account: HGAUSS | | | Docs in Scan Job 1 |
| User: Heinrich Gauss | Position | Doc. No. | No.  Pages |
| | ● Before | [ 1 ▼ ] | 1     23 |
| Mode: Scan/Mix Mode | ○ After | [    ▼ ] | 3     11 |
| Job: Scan Job 1 (2 docs) | | | Total:  34 |
| Log out | ⇐ Cancel | | Next ⇒ |

Fig. 8P

| | Summary of Scan Job 1 | | | | |
|---|---|---|---|---|---|
| Account: | | Photos (4) | Report (1) | Data (3) | Docs in Scan Job 1 |
| HGAUSS | Orientation: | Lndscp. | Portrait | Portrait | No.   Pages |
| User: | N-Up: | None | 2-Up | None | 4      16 |
| Heinrich Gauss | 2-sided: | 1-sided | 2-sided (T) | 1-sided | 1      23 |
| Mode: | Size: | A4 | 8.5 x 11 | 8.5 x 11 | 3      11 |
| Scan/Mix Mode | Resolution: | 700 DPI | 300 DPI | 500 DPI | |
| | Color | Color | B & W | Grayscale | |
| Job: | File Type: | PDF | PDF | PDF | |
| Scan Job 1 | Contrast: | ☐ | ▒ | ■ | Total:   50 |
| (3 docs) | | | | | |
| | | Delete? | Delete? | Delete? | |
| Log out | ⇐ Cancel | Add More Docs? | Edit Names | End Build ⇒ | |

Fig. 8Q

| | Would You Like To Rename Your Document? | |
|---|---|---|
| Account: | | Docs in Scan Job 1 |
| HGAUSS | | No.   Pages |
| User: | ○ Yes | 4      16 |
| Heinrich Gauss | [_____].pdf | 1      23 |
| Mode: | | 3      11 |
| Scan/Mix Mode | | |
| Job: | ● No, keep current name | |
| Scan Job 1 | (scan job 1) | Total:   50 |
| (3 doc) | | |
| Log out | ⇐ Back              Next ⇒ | |

Fig. 8R

Account:
HGAUSS

User:
Heinrich Gauss

Mode:
Scan/Mix Job

Job:
Scan Job 1
(1 doc)

Log out

Please Select Settings For The 2nd Document To Be Scanned

Orientation
● Landscape
○ Portrait

N-Up
● None
○ 2-Up

2-Sided
● 1-sided
○ 2-sided

Size
○ 8.5 x 11
● A4

Image Density
○ 100 PPI
○ 500 PPI
● 700 PPI

Color
○ Black & White
● Color
○ Grayscale

Contrast
○ ☐
○ ▦
● ▓

File-Type
○ JPEG
● PDF
○ Bitmap

⬅ Back          Job Build  X          Next ➡

Fig. 8S

Account:
HGAUSS

User:
Heinrich Gauss

Mode:
Scan/Mix Mode

Job:
Scan Job 1
(3 docs)

Log out

Please Select A Destination For Scan Job 1

● Send by E-mail
○ Send to Network Storage
○ Send To Connected Device

⇐ Back         Next ⇒

Fig. 10A

Account:
HGAUSS

User:
Heinrich Gauss

Mode:
Scan/Mix Mode

Job:
Scan Job 1
(3 docs)

Log out

Please Select Input Message Information

Recipient
| Scheer | ADD | Search |

Subject
|        | Search |

Send to Folder
|        | Search |

From: Gauss, Heinrich

To:
1) Johann Bismarck  [Del]
2) cc: Marie Schwartz  [Del]
3) bcc: Eric@ricoh.com  [Del]

☐ Send to Folder    ☒ Send to Me

⇐ Back         Next ⇒

Fig. 10B

Account:
HGAUSS

User:
Heinrich Gauss

Mode:
Scan/Mix Mode

Job:
Scan Job 1
(3 docs)

Log out

Please Select Input Message Information

Recipient

Alfred@ | ADD | Search

Alfred@ricoh-usa.com
Alfred@ricoh-research.com
Alfred@ricoh.com

Search

Back

From: Gauss, Heinrich
To:
1) Johann Bismarck [Del]
2) cc: Marie Schwartz [Del]
3) bcc: Eric@ricoh.com [Del]

X
Send to Folder   Send to Me

Next

Account:
HGAUSS

User:
Heinrich Gauss

Mode:
Scan/Mix Mode

Job:
Scan Job 1
(3 docs)

Log out

Please Select A Designating Prefix

Alfred@ricoh-research.com    BCC ▼

Back

Next

Fig. 10F

| List of E-Mails ||
|---|---|
| White List | Black List |
| FSclieffen@ricoh.com | ShadySam |
| FScheer@ricoh-usa.com | PetePoacher@hunt.com |
| HansFrancis@usa.gov | TrustyTed@evadetax.com |
| Eric @ricoh.com | VenderVince@blackmarket.com |

Fig. 10I

| List of Recipients Previously Sent to ||
|---|---|
| Alias Name | E-mail address |
| Francoise Schlieffen | FSclieffen@ricoh.com |
| Franz Scheer | FScheer@ricoh-usa.com |
| Hans Von Francis | HansFrancis@usa.gov |
| Alfred Moltke, USA | Alfred@ricoh-usa.com |
| Alfred Moltke, Research | Alfred@ricoh-research.com |
| Alfred Moltke, General | Alfred@ricoh.com |
| Eric Friedrich | Eric @ricoh.com |

Fig. 10J

Account:
HGAUSS

User:
Heinrich Gauss

Mode:
Scan/Mix Mode

Job:
Scan Job 1
(3 docs)

Log out

Please Confirm Your Selections

From: Gauss, Heinrich

To:
1) Johann Bismarck
2) cc: Marie Schwartz
3) bcc: Eric@ricoh.com

Subject: Project Report

Send To Me?    Yes

Send To Folder?  Yes

File Path
E:\Gauss\Work\Projects\Penguins

Back     Next

Account:
HGAUSS

User:
Heinrich Gauss

Mode:
Scan/Mix Mode

Job:
Scan Job 1
(3 docs)

Log out

Your Document Is Too Large To Send In One Email

Your document is too large to send in one e-mail. Instead, would you like to split the document and e-mail into two or more parts?

Yes    No

Back

Fig. 12D

```
<LogFields>
    <LogField Name="TITLE" Value="Document Scan Confirmation Page· />
    <LogField Name="TIMESTAMP" Value="Thu, J n 8, 20099:41:52 AM" />
    <LogField Name="DEVICESERIALNO· Value="L3765400260" />
    <LogField Name="DEVICEADDRESS" Value="10 .25.138 .63" />
    <LogField Name="FOLDERALIAS" Value="Gauss" />
    <LogField Name="FOLDER" Value="/PenguinProjects/" />
    <LogField Name="FILENAME" Value="Penguin-Habitats-Part1.pdf" />
    <LogField Name="FILENAME" Value="Penguin-Habitats-Part2.pdf " />
    <LogField Name="FILENAME" Value="Penguin-Habitats-Part3.pdf" />
    <LogField Name="FILENAME" Value="Penguin-Habitats-Part4.pdf " />
    <LogField Name="FILENAME" Value="Penguin-Habitats-Part5.pdf " />
    <LogField Name="#PAGES· Value="5" />
    <LogField Name="#SCANS· Value="S" />
    <LogField Name="STATUS" Value="SEN />
</LogFields>
```

Document Scan Confirmation Page

---

Time Stamp: Thu, Jan 8, 2009 9: 41: 52 AM

Device Serial#: L376S'100260

Device Address: 10.25.138.63

Folder Alias: Gauss

Folder: */PenguinProjects /*

Filename (s):

Penguin-Habitats-Part1.pdf

Penguin-Habitats-Part2.pdf

Penguin-Habitats-Part3.pdf

Penguin-Habitats-Part4.pdf

Penguin-Habitats-Part5.pdf

Pages(s) : 5

Scan(s): 1

Status: Sent

Fig. 13B

SYSTEM, APPARATUS AND METHOD FOR ENHANCING SCAN FUNCTIONALITY

TECHNICAL FIELD

This disclosure relates to tools (such as systems, apparatuses, methodologies, computer program products, etc.) enhance scan functionality, for example, on a multi-function apparatus including such scan functionality.

BACKGROUND

In the current information age, information technology (IT) tools play a significant role in our daily activities, and electronic transmission of documents is an increasingly prevalent means of transmitting information to another. IT tools such as scanners and multi-function printers (MFP) are utilized to convert hardcopy documents into electronic form, thereby decreasing the need for physical storage space and at the same time allowing the information in the paper documents to be transmitted quickly and more readily.

When a hardcopy document is scanned using a conventional scanner or MFP, the features the user can utilize are limited. For example, the user usually has the options of scanning the documents using available settings and configurations and choosing a destination (or in some instances, the destination is preset). However, users are often unable to access more advance features, such as combining multiple scanned documents together, without the aid of postscan software on a computer. Further, in many instances, the user cannot name the scan output file on the scanner or MFP. Also, once the user has scanned the document, the typical scanner or MFP will send the scan output only to a single destination and does not provided the facility for the user to select multiple destinations (e.g., one or more network storage devices and one or more e-mail addresses) simultaneously.

There remains a need for improved scan services and features that allow a user at a scanner or MFP to perform the tasks that are need to place the scan output in a desired format and to specify the destination in a manner in which the user may be accustomed at other devices (such as at a terminal or computer), and feel confident that the scan job is at, or on its way to, the intended destination in the manner desired.

SUMMARY

Various tools (for example, a system, an apparatus, application software, etc.) can be provided to enhance the set of features associated with scan functionality of a multi-functional apparatus.

For example, a multi-function apparatus having an automatic document feeder (ADF), an ADF detector to detect whether one or more sheets have been placed in the automatic document feeder, auto-scan provisions to scan an automatically fed document input through the automatic document feeder, a glass platen, manual scan provisions to scan a manually supplied document placed on the glass platen may be appropriately controlled by software, firmware, or otherwise to additionally comprise an output assembly part to assemble an output document, based on job output settings. In such example, a scan job build interface may be provided for controlling a mixed mode scan job build.

In one example, such mixed mode scan job allows scanned ADF-fed pages to be combined with manually scanned pages to generate one multi-mode output job. In another example, the mixed mode job can include one or more images of one page orientation and additional images of a different page orientation, and/or one or more images of one page size and additional images of a different page size, and/or one or more images of one image resolution and additional images of a different image resolution, and/or one or more images of one color mode and additional images of a different color mode, and/or one or more images of one page image density and additional images of a different image density, and/or one or more images of one page contrast and additional images of a different page contrast, and/or one or more images of one page scan mode and additional images of a different page scan mode.

In another aspect, a multi-function apparatus having scan-to-email functionalities may be configured to include a scan destination user interface (UI) to receive user specification of a user address and further to include an UI part to activate send-to-me function to transmit the output document via the scan-to-email functionalities to a pre-registered user address. Further, the scan destination interface may additionally include UI provision to receive user specification of a copy address, separate from the user address, to which the output document is additionally transmitted. In addition, the user interface provided by the multi-function apparatus may include an output settings interface that include UI provisions to receive user specification of a blind copy address, separate from the user address, in connection with transmission of the output document. Such blind copy address is not indicated in the transmission received by any of the recipients of the output document.

In another aspect, a multi-function apparatus having scan-to-folder functionalities may be configured to include a scan destination user interface (UI) to receive user specification of a network storage folder as a destination and further to include an UI part to activate a send-to-folder function to cause the output document to be transmitted via the scan-to-folder functionalities to, and stored in, the specified network storage folder. Further, when the send-to-folder function is activated to cause the output document to be transmitted via the scan-to-folder functionalities to the specified network storage folder, the output document can be also automatically transmitted to the user address, unless the send-to-me function is deactivated.

In another example, a multi-function apparatus having send-to-folder function, scan-to-email functionalities, and a scan destination interface to receive user specification of one or more email destinations may be configured to include provisions such that when the output document is transmitted via the scan-to-email functionalities to the one or more email destinations, the output document is also automatically transmitted to a user-specified network storage folder, unless the send-to-folder function is deactivated.

In another example, a multi-function apparatus having scan-to-email functionalities, a scan destination interface to receive user specification of one or more email destinations, and a cache history configured to archive destinations previously specified by the user may be configured to include an auto-fill function to suggest, upon user entry of one or more characters of a destination address, one or more archived destinations matching the one or more characters entered by the user. Such auto-fill function may be configured to automatically insert a domain of the destination, in a case that the user-entered characters matching an archived destination is terminated by an "@" symbol.

In another example, a multi-function apparatus having scan-to-email functionalities and a scan destination interface to receive user specification of one or more email destinations may be configured to include an alias function to receive user specification of an alias name in association with a specified destination.

In another example, a multi-function apparatus having scan-to-email functionalities and a scan destination interface to receive user specification of one or more email destinations may be configured to include an authenticated search function to search for a destination, in a directory of destination candidates, by user entry of one or more characters of a destination address, or one or more characters of the target name associated with the destination. Such scan destination interface may include an exclusion function to receive user specification of one or more portion of the directory of destination candidates to be excluded from the search.

In another example, a multi-function apparatus having scan-to-email functionalities and a scan destination interface to receive user specification of one or more email destinations may be configured such that a scan-to-email function is to be performed and the output document exceeds a maximum e-mail size, the scan-to-email functionalities split the output document into multiple files, each file of which does not exceed maximum e-mail size, and transmits the multiple files in respective e-mails to the user-specified destinations.

In another example, a multi-function apparatus having scan-to-folder functionalities and a send-to-folder function may be configured such that when the send-to-folder function is activated and the output document exceeds a maximum file folder size of a network storage folder, the scan-to-folder functionalities split the output document into multiple files, each file of which does not exceed said maximum file folder size, and causes the multiple files to be stored in respective network storage folders.

In another aspect, a multi-function apparatus may be configured to include a secure document control interface to receive user specification, when the output document is in a portable document format, of a setting to permit changes to the output document in the portable document format, and in the absence of said setting, the output document assembled by the output assembly is in a form in which the output document cannot be modified.

In another aspect, a multi-function apparatus may be configured to include a secure document control interface to receive user specification, when the output document is in a portable document format, of a setting to permit text copying from the output document in the portable document format, and in the absence of said setting, the output document assembled by the output assembly is in a form from which text copying cannot be performed.

In another aspect, a multi-function apparatus may be configured to include a secure document control interface to receive user specification, when the output document is in a portable document format, of a setting to permit text copying from the output document in the portable document format, and in the absence of said setting, the output document assembled by the output assembly is in a form that cannot be printed.

Many other aspects and features that can enhance scan functionality of a multi-function apparatus are discussed infra.

BRIEF DESCRIPTION OF THE DRAWINGS

The aforementioned and other aspects, features and advantages can be more readily understood from the following detailed description with reference to the accompanying drawings wherein:

FIGS. 10A-10K show examples of user interface display screens displayed on an apparatus having scanning functionality, for a user to specify one or more destinations of a scan job output, according to an exemplary embodiment;

FIGS. 12A-12F show examples of user interface display screens displayed on an apparatus having scanning functionality, for a user to specify one or more destinations of a scan job output, according to an exemplary embodiment;

FIG. 13A shows an example of a log generated by an apparatus having scanning functionality and configured to split a scan output into multiple files, according to an exemplary embodiment;

FIG. 13B shows an example of a document scan confirmation page, displayed on, or output by, an apparatus having scanning functionality and configured to split a scan output into multiple files, according to an exemplary embodiment.

DETAILED DESCRIPTION

Figure 1:
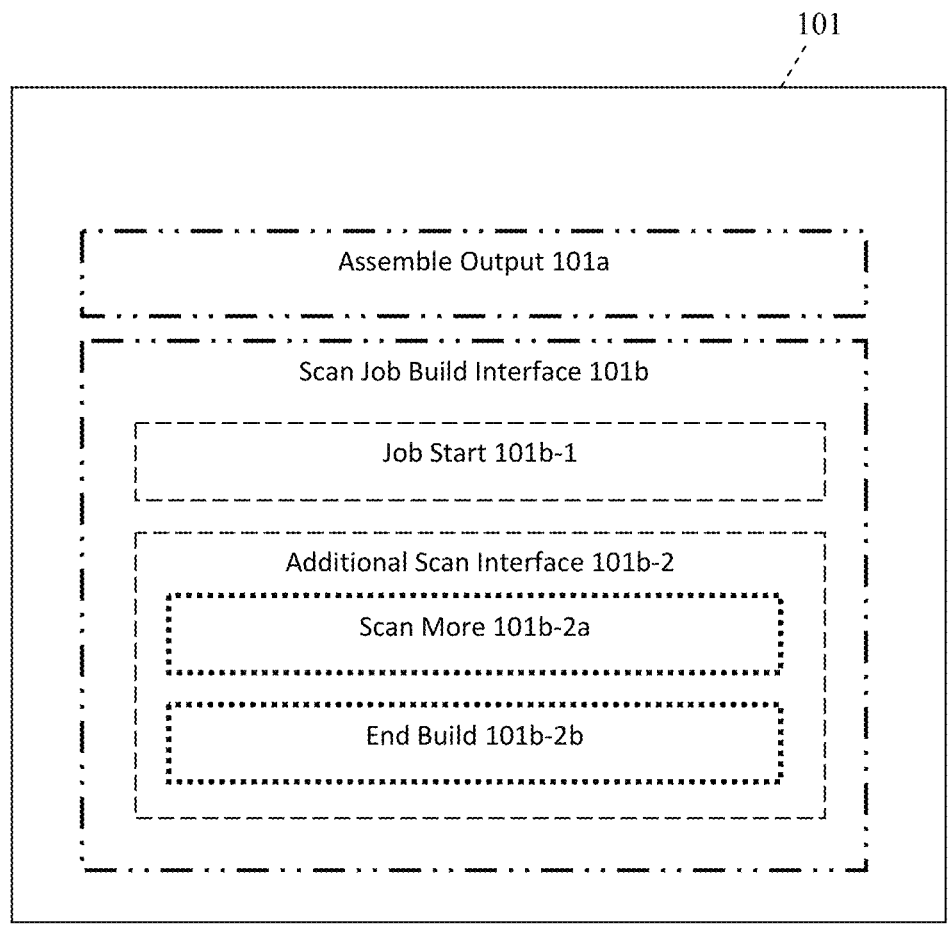
FIG. 1 shows a block diagram of an apparatus for controlling a mixed mode scan job build, according to an exemplary embodiment, in a device having scanning functionality.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted when it may obscure the subject matter of the present invention. Referring now to the drawings, wherein like reference numerals designate identical or corresponding parts throughout the several views, there are described tools (systems, apparatuses, methodologies, computer program products, etc.) for communicating with a client device that is not configured to conform to a specific certification protocol in a public key infrastructure.

FIG. 1 shows schematically a diagram of an MFP 101 that includes an output assembly part 101a, a scan job interface which includes a job start part 101b-1 and an additional scan interface 101b-2. The additional scan interface 101b-2 further includes a scan more part 101b-2a and an end build part 101b-2b.

In addition to comprising the features stated above, the MFP 101 can also be any device that can perform a scanning function, connect to network devices or the internet and contains other conventional MFP features such as a glass platen, an automatic document feeder (ADF) and an ADF detector. The MFP 101 may also be configured as shown in FIG. 2, which is discussed infra.

The glass platen is a component of the MFP 101 that allows the user to perform scanning. The glass platen is usually a flat pane made up of glass. The user places a sheet such as paper or a photograph onto the glass pane in order for MFP 101 to scan the sheet by illuminating it with bright light and capturing the image on the sheet using a charge-coupled device. The glass platen is a conventional feature of scanning devices and therefore, for the interest of brevity, will not be discussed further.

The ADF is a device on the MFP 101 that allows the user to perform scanning on multiple sheets of a document without having to manually scan each page one-by-one such as previously mentioned on a glass platen. To facilitate the scanning, the user places one or more sheets on to the ADF. The ADF detector is then used to detect whether the one or more sheets are in place. In that case that they are in place, the ADF starts the scanning process by taking a single sheet off the ADF and scanning it. For cases in which there are two or more sheets on the ADF, the scanning process is initially performed by taking a single first sheet off the ADF and scanning it. The process is repeated for the next sheet beneath the single first sheet and the sheet after that until there are no more sheets left. Consequently, there is no user interaction after the process begins, thereby making the scanning more efficient and quicker.

The output assembly part 101a assembles an output document from one or more set of sheets based on the configurations and specifications that the user has previously selected on the MFP 101. For example, the user may have scanned one set of sheets ("A") using one set of configurations (i.e. Size: A4, Color: Black and White, Orientation: Portrait) while the user may have scanned another set of sheets ("B") using another set of configurations (i.e. Size: 8.5×11, Color: Color, Orientation: Landscape). The output assembly part 101a then combines these two documents "A" and "B" into a single output document with each of configurations of documents "A" and "B" still intact.

The scan job build interface 101b allows the user to direct the MFP 101 to perform a mixed mode scan job build. The mixed mode scan job build is another type of scan job and is different from a conventional scan job in several aspects. In the conventional scanning process, the user is allowed to only scan one set of documents at a time. As a result, all of the pages within the set of documents have the same configurations (i.e. Size: A4, Color: Black and White, Orientation: Portrait). On the other hand, in a mixed mode scan job build, the user is not limited to scanning all of the documents at once. The user may scan a portion of the set of documents using one set of configurations and scan another portion of the documents using another set of configurations. The output assembly part 101a then combines both sets of documents into a single output document with the single output document now containing both sets of configurations.

The job start part 101b-1 commences the start of the mixed mode scan job build. When the mixed mode scan job build has started, the ADF detector detects whether there are one or more sheets located on the ADF or on the glass platen. In the case that there are sheets on both the ADF and the glass platen (i.e. someone else accidentally left their sheet on the glass platen), the scan job build interface causes the automatic scanning function of the MFP 101 to scan the sheets located on the ADF. Thus, the sheets located on the ADF take precedence over the sheet located on the glass platen. The sheets on the ADF that are scanned immediately after the job start part 101b-1 commences the start of the mixed mode are considered to be the sheets that are at the beginning at the mixed mode scan job. On the other hand, in the case that there is no one or more sheets on the ADF, the scan job build interface instead causes a manual scanning function of the MFP 101 to perform scanning on the sheet on the glass platen instead. Likewise the sheet on the glass platen that is scanned immediately after the job start part 101b-1 commences the start of the mixed mode is considered to be the sheet that is at the beginning at the mixed mode scan job.

The additional scan interface 101b-2 allows the user to request the MFP 101 to scan another set of sheets placed on the ADF or the glass platen. In this case after the user has scanned the first set of documents, the user has the option of performing a mixed mode scan job build. Thus, the user is not constrained to selecting a conventional scan job option or a mixed mode scan job build option as a permanent task for the scan job. The user may first perform a conventional scan job. Then, if the user decides that he or she wants to scan in mixed mode instead, the additional scan interface 101b-2 can allow the user that option, thereby changing the current task from a conventional scan job to a mixed mode scan job.

The scan more part 101b-2a causes the MFP 101 to scan more sheets of documents that are placed on the ADF or the glass platen and in addition adds the sheets of documents to the existing documents that have already been scanned.

The end build part 101b-2b causes the MFP 101 to finish adding sheets to the current mixed mode scan job. In this case, once the user is finished with scanning all of his or her documents and is ready to output them as a single output document, the user ends the scanning process via the end build part 101b-2b.

Figure 2A:
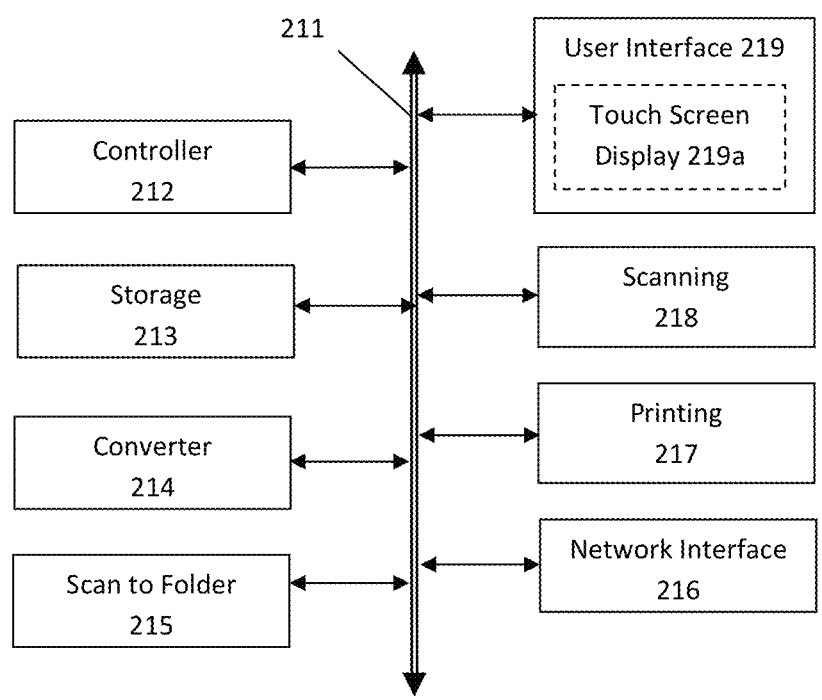
FIG. 2A shows a block diagram of an exemplary configuration of a multi-function apparatus including scanning and printing functionalities.

FIG. 2A shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities. The MFP 210 shown in FIG. 2A includes a controller 212, and various elements connected to the controller 212 by an internal bus 211. The controller 212 controls and monitors operations of the MFP 210. The elements connected to the controller 212 include storage 213 (for example, random access memory, read-only memory, hard disk drive, portable storage media drive such as for optical discs, magnetic discs, magneto optical discs, etc., semiconductor memory cards, combinations of storage media, etc.), a converter 214, a scan to folder 215, a network interface (I/F) 216, printing 217, scanning 218 and a user interface 409.

Storage 213 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 213 and executed by the controller 212 to carry out the instructions. Such instructions can include instructions for performing specified functions (such as printing, scanning, faxing, copying, e-mailing, etc.) of the MFP 210, to enable the MFP 210 to interact with a terminal, as well as perhaps other external devices, through the network interface 216, and interactions with users through the user interface 219.

The network interface 216 is utilized by the MFP 210 to communicate with other network-connected devices such as a terminal, a server (e.g. the server 303 of FIG. 3) and receive data requests, print jobs, user interfaces, and etc.

The user interface 219 includes one or more electronic visual displays that display, under control of controller 212, information allowing the user of the MFP 210 to interact with the MFP 210. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 210, so as to allow the operator to interact conveniently with services provided on the MFP 210, or with the MFP 210 serving as terminal for accessing electronic data or other content through the network. User interfaces or other contents received through the network via the network interface 216 can be displayed on the display screen.

The display screen does not need to be integral with, or embedded in, a housing of the MFD 210, but may simply be coupled to the MFD 210 by either a wire or a wireless connection. The user I/O 219 may include keys and/or buttons (such as graphical keys or buttons, or other graphical elements, of a GUI on a touchscreen display 219a) for inputting information or requesting various operations. Alternatively, the user I/O 219 and the display screen may be operated by a keyboard, a mouse, a remote control, voice recognition, or eye-movement tracking, or a combination thereof.

Since the MFD 210 is typically shared by a number of users, and is typically stationed in a common area, the MFD 210 preferably prompts the user to supply login credentials or authentication information, such as user name (or other user or group information), password, access code, etc. The user credentials may also be stored for the session and automatically supplied if access to other devices through the network requires it. On the other hand, such other devices may prompt the user to supply other user credentials through the user interface.

Other methods of authentication may also be used. For example, the MFD 210 may be equipped with a card reader or one or more biometrics means (such as comparing fingerprints, palm prints, voice or speech, retinas or irises, facial expressions or features, signature, etc.).

The MFD 210 may communicate the user credentials, provided in the manners discussed above, to other devices or applications connected to the MFD 210 via a network (e.g., the network 304 of FIG. 3) for determining authorization for performing jobs.

The scan to folder 605 allows the MFP 101 to send scanned images to a folder in a storage device such as hard disk drive at another location (e.g. the terminal 302 of FIG. 3A).

Scanning 218, printing 217, and network interface 218 are otherwise conventional, and therefore, a detailed description of such conventional aspects is omitted in the interest of clarity and brevity. The MFP 210 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

Figure 2B:
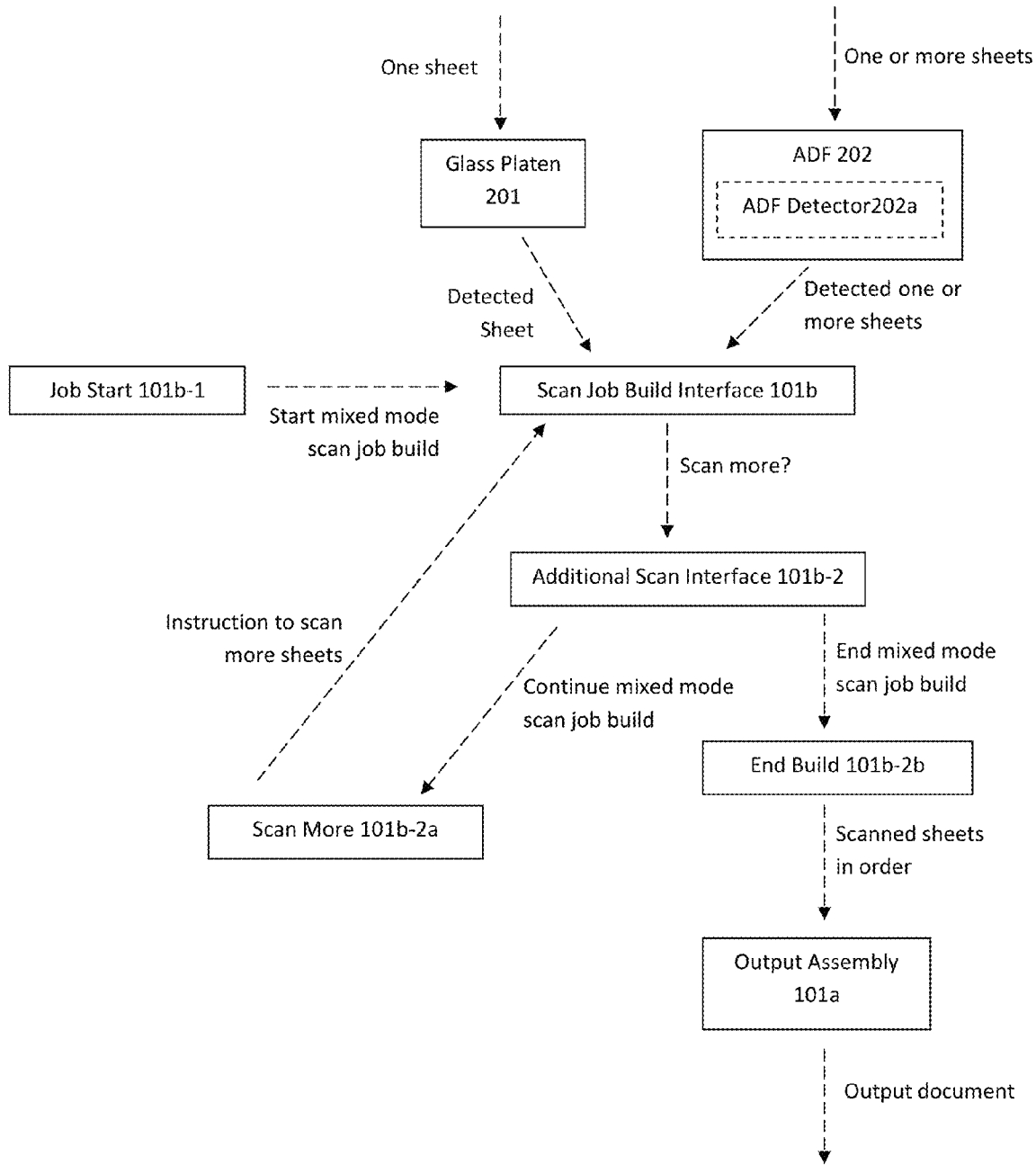
FIG. 2B shows a flow diagram for a mixed mode scan job build on a multi-functional apparatus, according to an exemplary embodiment.

FIG. 2B shows schematically a block diagram of an MFP 101 and how the components of the MFP 101 such as the glass platen (glass platen 201 in FIG. 2B) ADF (ADF 201 in FIG. 2B), the ADF detector (ADF detector 201a in FIG. 2B), the output assembly part 101a, the scan job build interface 101b, the job start part 101b-1, the additional scan interface 101b-2, the scan more part 101b-2a and the end build part 101b-2b interact with each other when the user performs a mixed mode scan job.

When the user wishes to perform a scan job (conventional or mixed mode scan job build), he or she places one or more sheets on to the ADF 202 or a single sheet on to the glass platen 201. Then the user selects the configurations for the scan job on the scan job interface 101b. Then user can select either to performing conventional scan job or a mixed mode scan job build. In the case that the user decides to perform a mixed mode scan job build, the job start part 101b-1 triggers the start of the mixed mode scan job build by causing the one or more sheets on the ADF 202 or the sheet on the glass plate 201 to be scanned.

In the case that the user places a sheet on the glass platen, the scan job interface 101b causes the manual scanning function of the MFP 101 to perform scanning on the sheet on the glass platen. On the other hand, in the case that the user places one or more sheets onto the ADF 202 and the ADF detector 202a detects this, the scan job build interface 101b causes the automatic scanning function of the MFP 101 to scan the sheets located on the ADF 202, instead. It should be noted, as stated previously, if there are one or more sheets on both the ADF 202 and the glass platen 201, the sheets on the ADF 202 take precedence to the sheet on the glass platen. Consequently, the MFP 101 scans the one or more sheets on the ADF 202 instead. On the other hand, in the case that the ADF detector 202a does not detect any sheets or documents on the ADF 202 and there is a sheet on the glass platen, then the sheet on the glass platen is scanned.

After the first sheet or first sheets have been scanned, an additional scan interface 101b-2 is presented to the user by the MFP 101 to request that an additional sheet or additional sheets be put onto the glass platen 201 or the ADF 202. In the case that the user selects to scan more sheets and therefore places the additional sheet or sheets onto either the glass platen 201 or the ADF 202, the scan more part 101b-2a of the scan interface 101b-2 directs the MFP 101 to continue the process of performing the mixed mode scan and scan the sheet or sheets. After the scanning has finished, the scan more part 101b-2a adds or appends the additional scanned sheet or sheets the first sheet or first sheets. In the case that the user selects not to scan more sheets, the end build part 101b-2b causes the MFP 101 to end the mixed mode scan job since there are not additional sheet or sheets to be scanned.

When the end of the mixed mode scan job build is caused by the end build part 101b-2b, the scan job build interface 101b causes the output assembly part 101a to combine the sheets previously scanned into single output document with each of configurations of the sheets still intact. It should be noted that the single output document may include at least one sheet that was scanned using the automatic scanning function or the manual scanning function.

Figure 3:
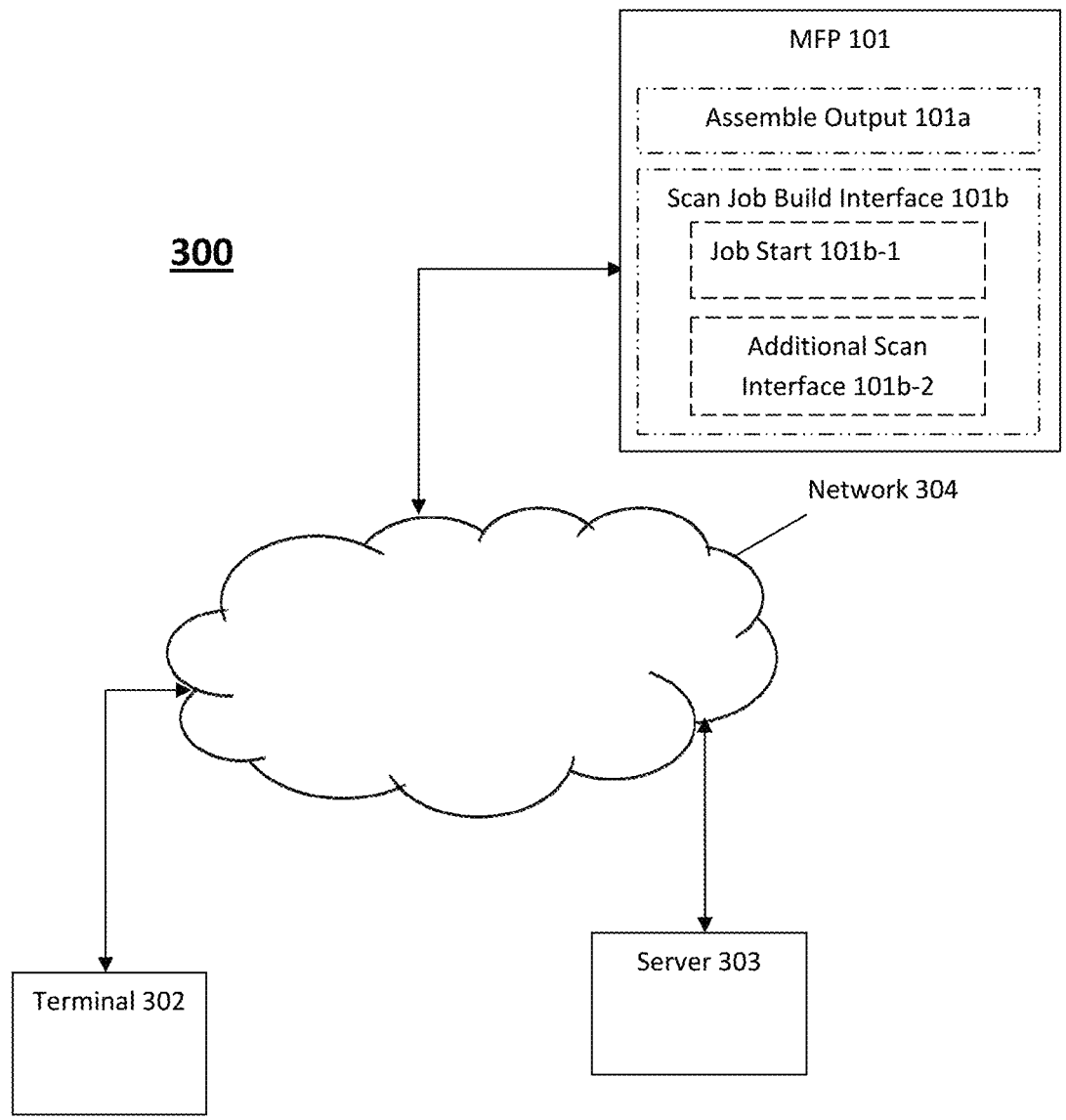
FIG. 3 shows a block diagram of an apparatus for controlling a mixed mode scan job build in a multi-functional apparatus, according to an exemplary embodiment.

FIG. 3 shows schematically a system 300 that includes, all of which are interconnected by network 303, a multi-functional printer (MFP) 101 and a terminal 302.

The terminal 302 can be any computing device, including but not limited to a personal, notebook or workstation computer, a kiosk, a PDA (personal digital assistant), a mobile phone or handset, another information terminal, etc., that can communicate with other devices through the network 303. Although only one user terminal is shown in FIG. 3A, it should be understood that the system 300 can include a plurality of user terminal devices (which can have similar or different configurations). The terminal can be used to access electronic mails (e-mails) that have been sent by the MFP 101. For example, a user may be scanning documents at the MFP 101 and he or she may want to send the output documents to different destinations. One destination can be an e-mail address which can accessed through the terminal 302. Another destination can be a folder on a hard drive of the user's personal computer such as terminal 302. The terminal 302 is further described infra with reference to FIG. 4.

The server 303 is connected to network 304, and stores software that is used for configuring functions on the MFP 101. In this case, the MFP 101 may not have any pre-installed software and instead such software is downloaded from another location (e.g., the server 303) in order to perform functions such as the mixed mode scan job build. For example, the mixed mode scan job build may not be available to all users. Consequently, the software for the mixed mode scan job build may be not be on the MFP 101 for various reasons (i.e. save storage space, prevent unauthorized security access to certain MFP 101 features, etc.). Thus, in case in which a user who is authorized to access the mixed mode scan job build of the MFP 101, the server 303 sends the software for the mixed mode scan job build to the MFP 101. However, before sending the software the server 303 checks the user credentials of the user. This is obtained when the user inputs a username and password in to the MFP 101 to access its features. If the user has authorization to access the features of the mixed mode scan job, the server 303 sends the software to the MFP 101. Otherwise, the software is not sent.

In an exemplary embodiment, the server 303 may also be used to store the e-mails sent and files outputted by the MFP 101. For example, the user of the MFP 101 may designate to send any scanned documents to his or her e-mail as well as to a folder accessible to him or her. Consequently, the server 303 may contain an e-mail system and a storage system which stores the e-mails received by the user and the documents owned by the user. Therefore, the user may access the e-mails and the files via the terminal 302. Thus, it is not necessary that the MFP 101 be directly connected with the user's terminal in order for the user to access e-mails and files. The server 303 is further described infra with reference to FIG. 5.

The network 303 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 303. In addition, the network 303 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 4:
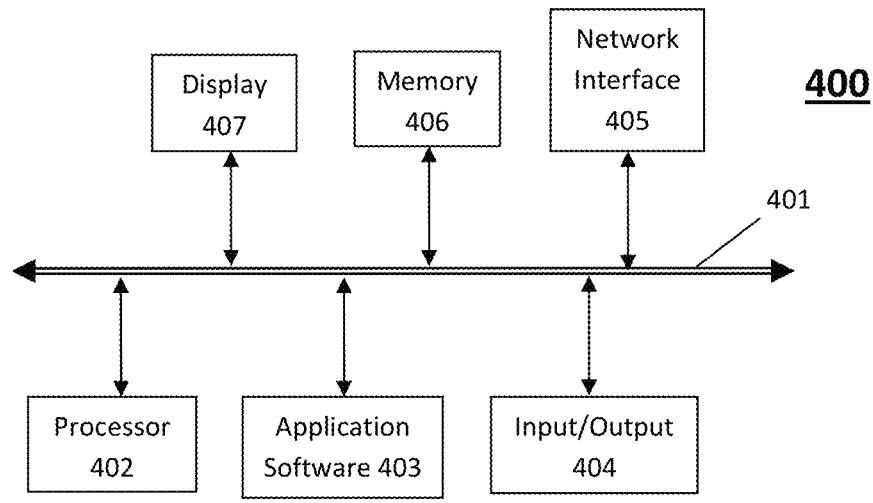
FIG. 4 shows a block diagram of an exemplary configuration of a terminal.

FIG. 4 shows an exemplary constitution of the terminal 302 of FIG. 3 (for example, as a computer). In FIG. 4, a computer 400 includes a processor (or central processing unit) 402 that communicates with a number of other components, including an application software 403, input/output 404 (such as mouse, keyboard, touchpad, stylus, microphone and/or speaker with voice/speech interface and/or recognition software, etc.), network interface 405, memory 406 and display 407, by way of an internal bus 401.

The memory 406 can provide storage for program and data and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 405 provides a connection (for example, by way of an Ethernet connection or other network 10 connection which supports any desired network protocol such as, but not limited to TCP/IP, IPX, IPX/SPX, or Net-BEUI) to the network to which the computer 400 is connected (e.g. network 303 of FIG. 3A).

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 5:
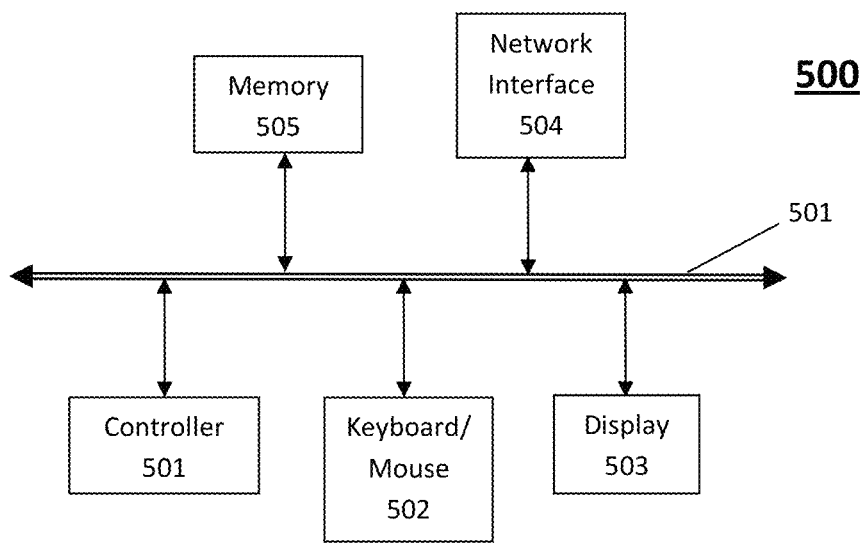
FIG. 5 shows a block diagram of an exemplary configuration of a computing device that can be configured to operate as a server or another service providing device.

FIG. 5 shows an exemplary constitution of a computer 500 that can be configured (for example, through software) to operate (at least in part) as the server 303 of FIG. 3. As shown in FIG. 5, the management unit 500 includes a controller (or central processing unit) 501 that communicates with a number of other components, including keyboard/mouse 502, display 503, network interface 504 and memory or storage part 505, by way of a system bus 501. The computing device 500 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 6:
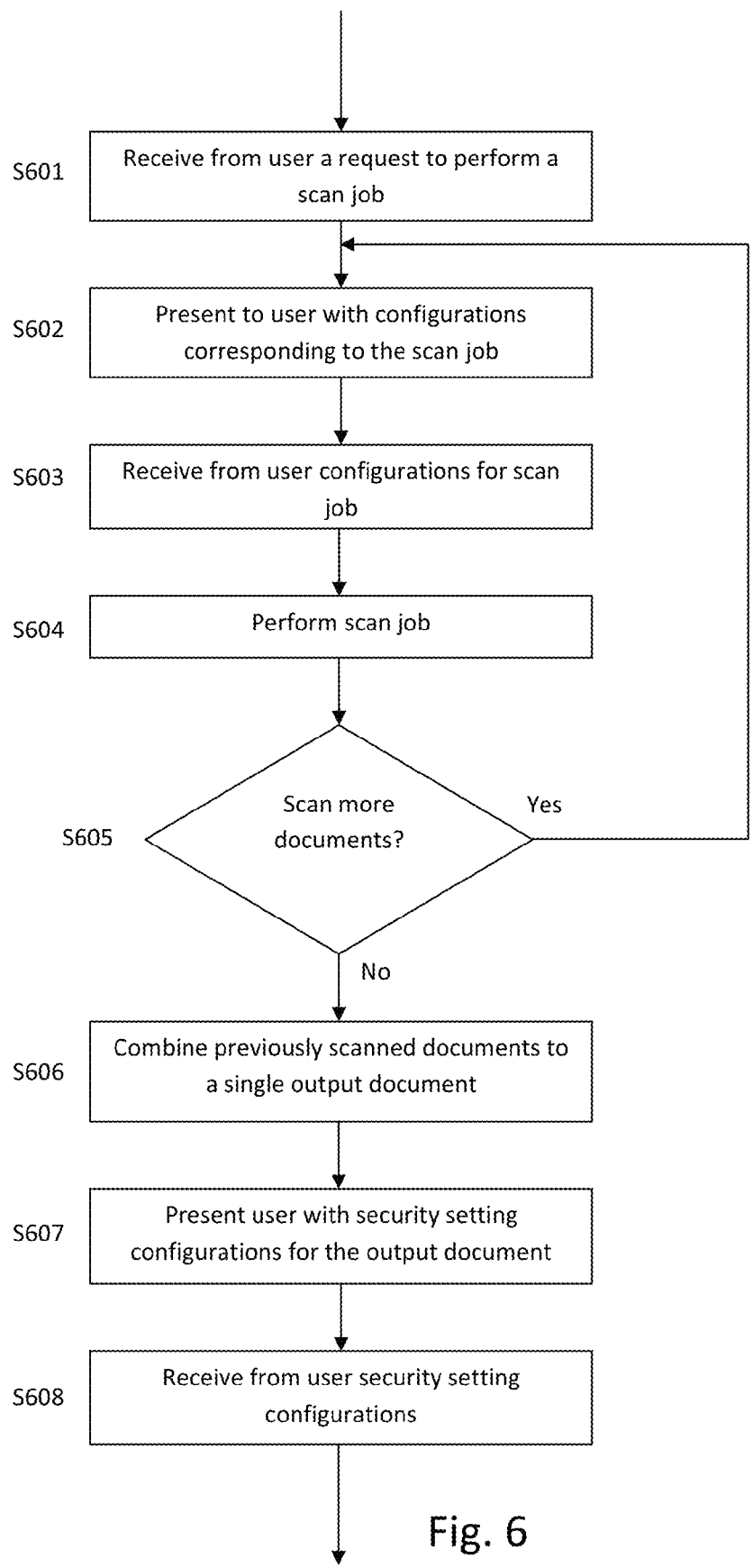
FIG. 6 shows a flow chart of a method performed an apparatus having scanning functionality, according to an exemplary embodiment.
Figure 7:
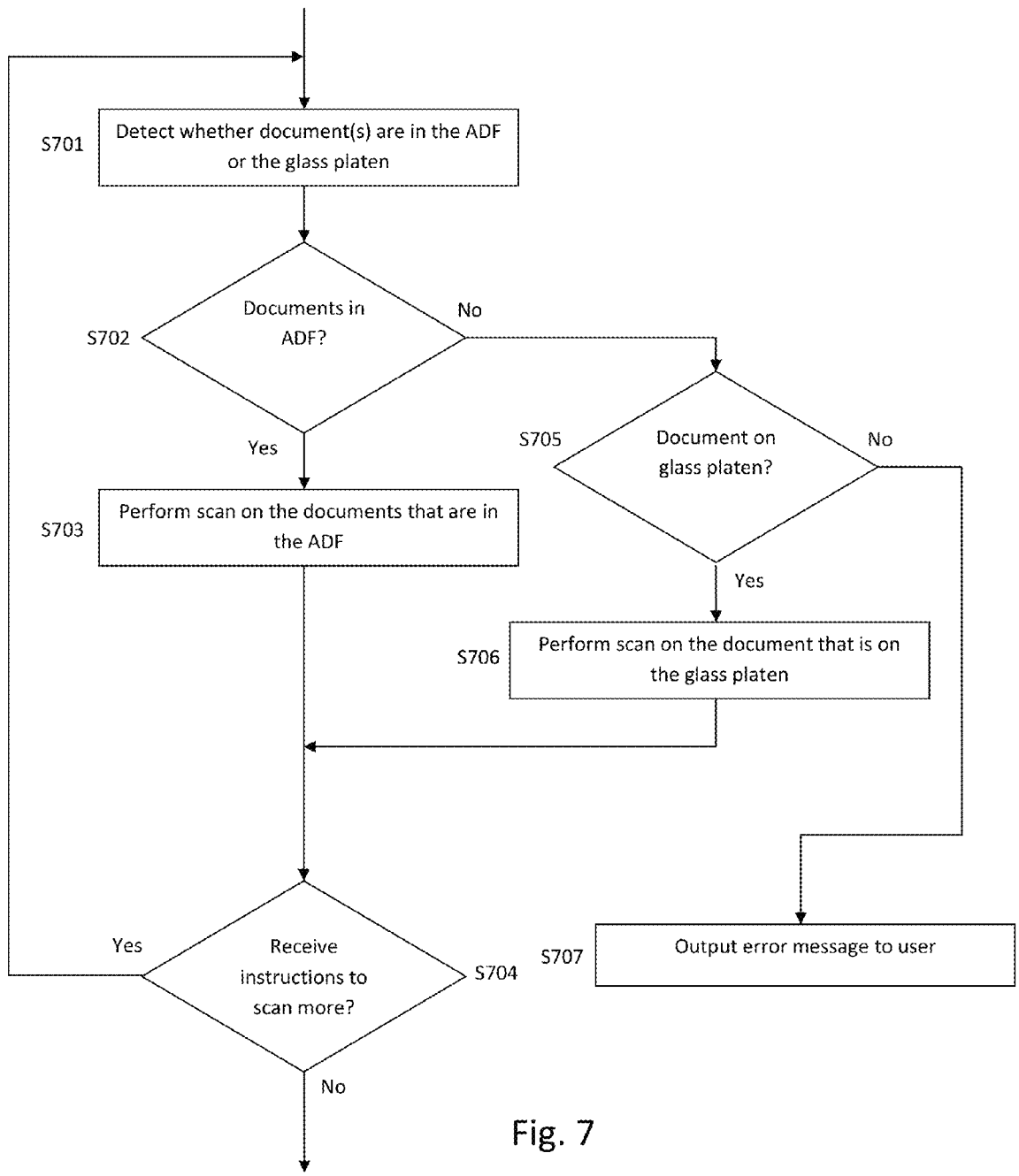
FIG. 7 shows a flow chart of a method performed an apparatus having scanning functionality, according to an exemplary embodiment.

FIGS. 6 and 7 shows a process performed by an MFP (e.g., 101), for performing a mix mode scan job, according to an exemplary embodiment.

Figures 8A, 8B:
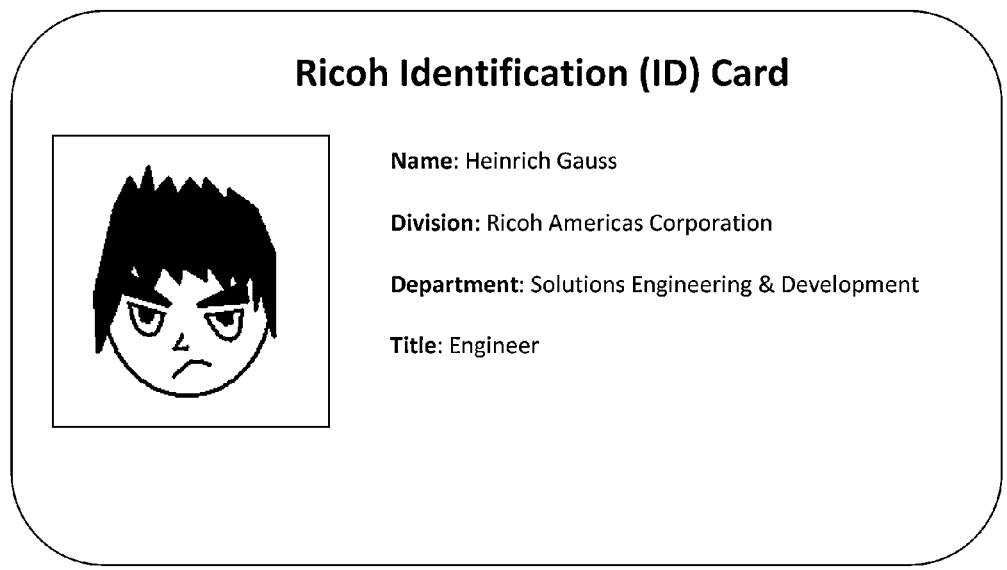
FIGS. 8A-8S show examples of user interface display screens displayed on an apparatus having scanning functionality, according to an exemplary embodiment.
Figure 8C:
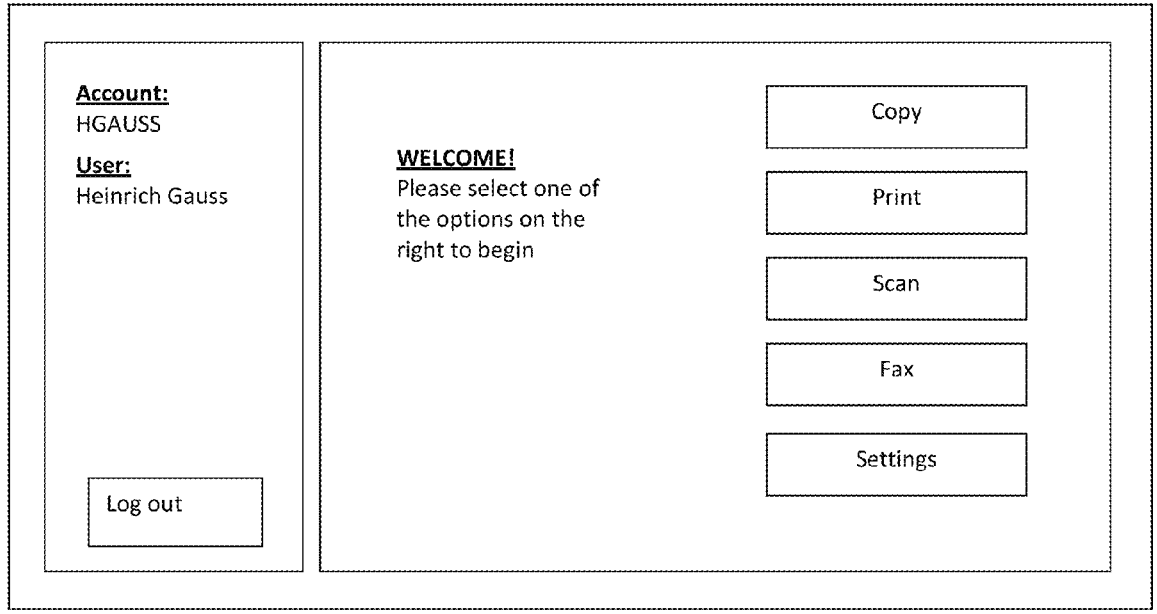

When a user wants to scan documents by using the MFP 101, the user first inputs user credentials to access the MFP 101 as shown in FIG. 8A. It should be noted that the user credentials are not limited to the form of a username and password. For example, the user may press a "Login Using ID Card" button and use an ID card, such as shown in FIG. 8B to perform the login, instead. After the MFP 101 has verified the information sent by the user, the user is then presented with a list of functions that the MFP 101 can perform (i.e. copying, printing, scanning, faxing) as shown in FIG. 8C. In this case, the user has selected the scanning function of the MFP 101 (step S601).

Figure 8D:
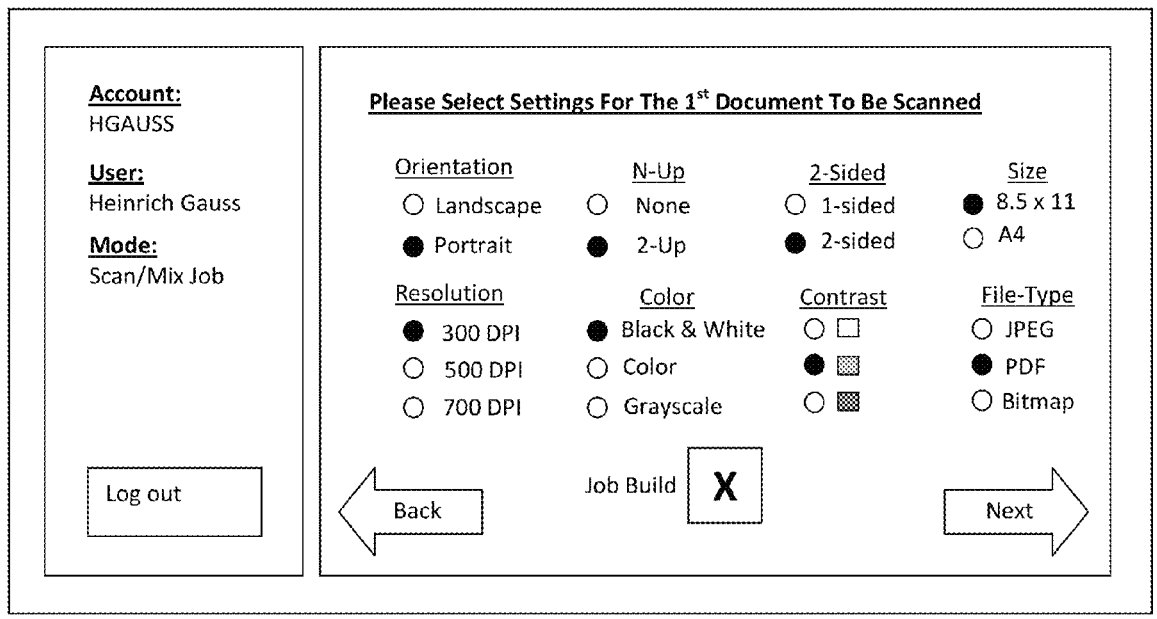

The MFP 101 then presents the user a screen displaying settings (i.e. orientation, N-up, 2-sided, size, resolution, color, contrast, file-type) and their corresponding configurations (i.e. landscape, portrait, simplex, duplex, color, grayscale, etc.) that can be used for scanning the document (step S602) as illustrated in FIG. 8D. It should be noted that the settings and their corresponding configurations are merely exemplary and do not constitute an exhaustive list. As shown, the user may select any combination of the configurations for the scan job. In this case the user "Heinrich" has selected "Portrait" for orientation, "None" for N-Up, "1-sided" for the 2-sided option, "8.5×11" for size, "300 DPI" for resolution, "Black & White" for color, a medium level of contrast, and "PDF" for file type. The user may also further select the "Job Build" button to commence with the mixed mode scan job build. This "Job Build" button causes the transition from a conventional mode of scanning to a mixed mode scan job build. Consequently, if the "Job Build" button is not checked, the scanner does not commence with a mixed mode scan job build, and instead the process leads to the MFP requesting the user for information on the destination to send the output document to. On the other hand, if the "Job Build" button is checked, the user is prompted to scan more documents after the previous document has been scanned. It should be noted that not all users are able to access the mixed mode scan job. Consequently, the "Job Build" button may not be selectable for those users. The user than confirms the selections made by pressing the "Next" button. The MFP 101 then receives the settings for the scan job from the user (step S703), and performs the scanning process (step S604).

Figure 8E:
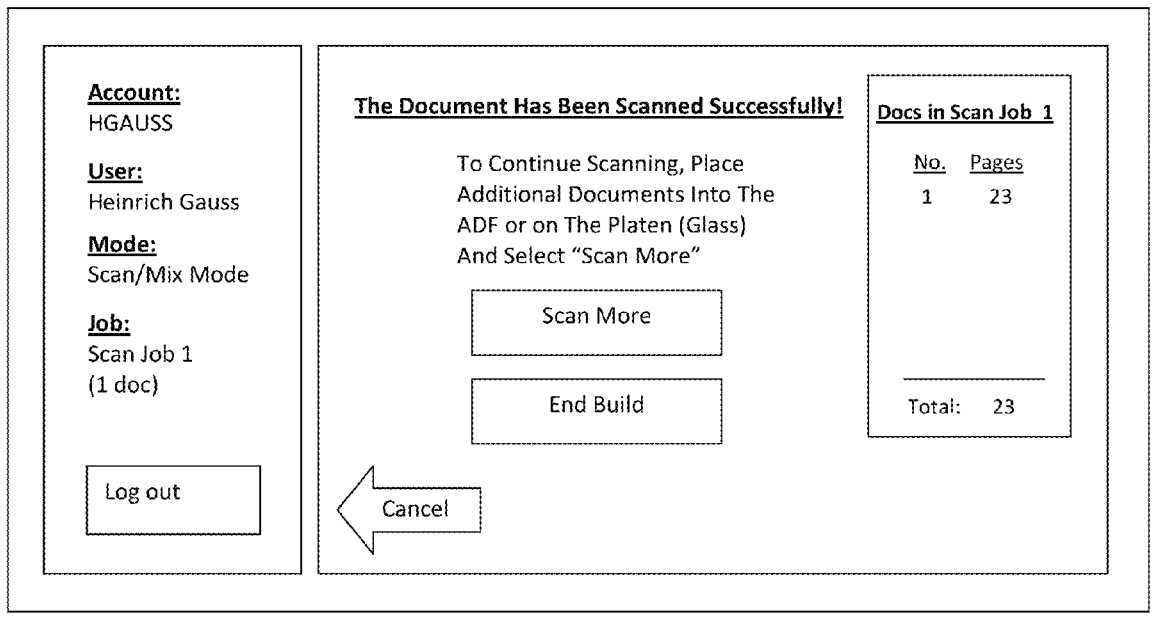
Figure 8F:
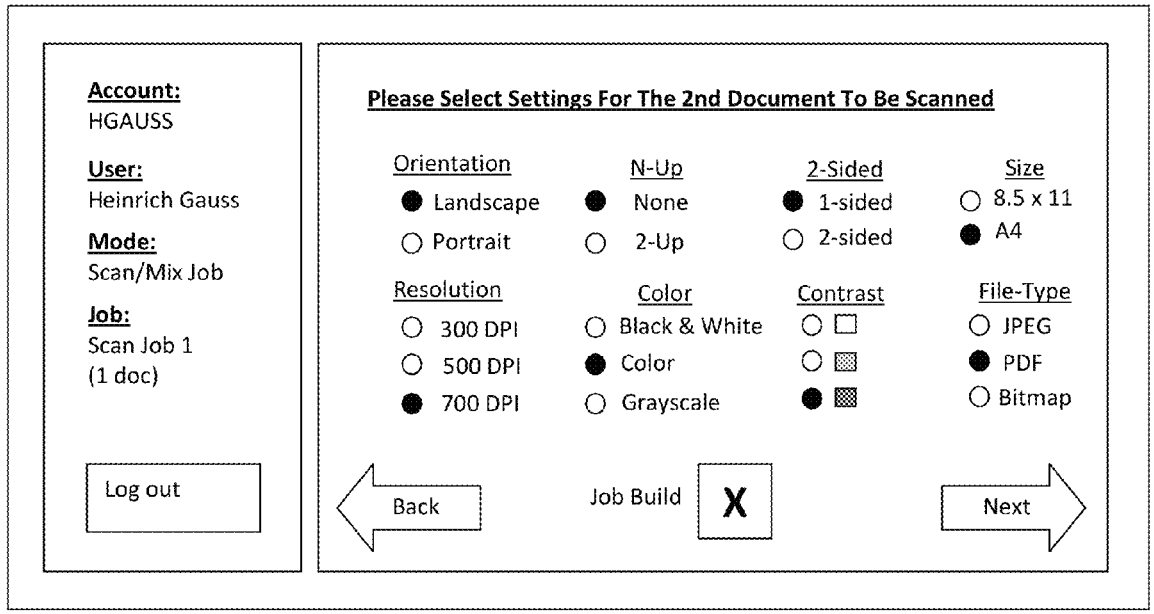

After the scanning of the first document has been performed, the MFP 101 prompts the user to either continue scanning more documents or end the current mixed mode scan job (step S605) as shown in FIG. 8E. In the case that the user selects not to continue scanning more documents to be added to the current mixed mode scan job build (step S605, no), the user presses the "End Build" button which causes the MFP 101 to end the process of the mixed mode scan job build. Otherwise, in the case that the user presses the "Scan More" button, the user is presented again with the settings and their corresponding configurations for the scan job and the process is repeated (step S605, yes). It should be noted that even though multiple documents can be scanned and combined with each other, it does not mean that each of the documents must contain the same settings as the others. For example, as shown in FIG. 8F, the settings used for scanning the second document are very much different from the first document. In this case the user "Heinrich" has selected "Landscape" for orientation, "2-up" for N-Up, "2-sided" for the 2-sided option, "A4" for size, "700 DPI" for resolution, "Color" for color, a darker level of contrast, and "PDF" for file type. Consequently, the final output of the mixed mode scan job (assuming that "Heinrich" only scans these two documents) may contain a document that has one set of pages in size 8.5×11 and the another set in size A4.

Figure 8G:
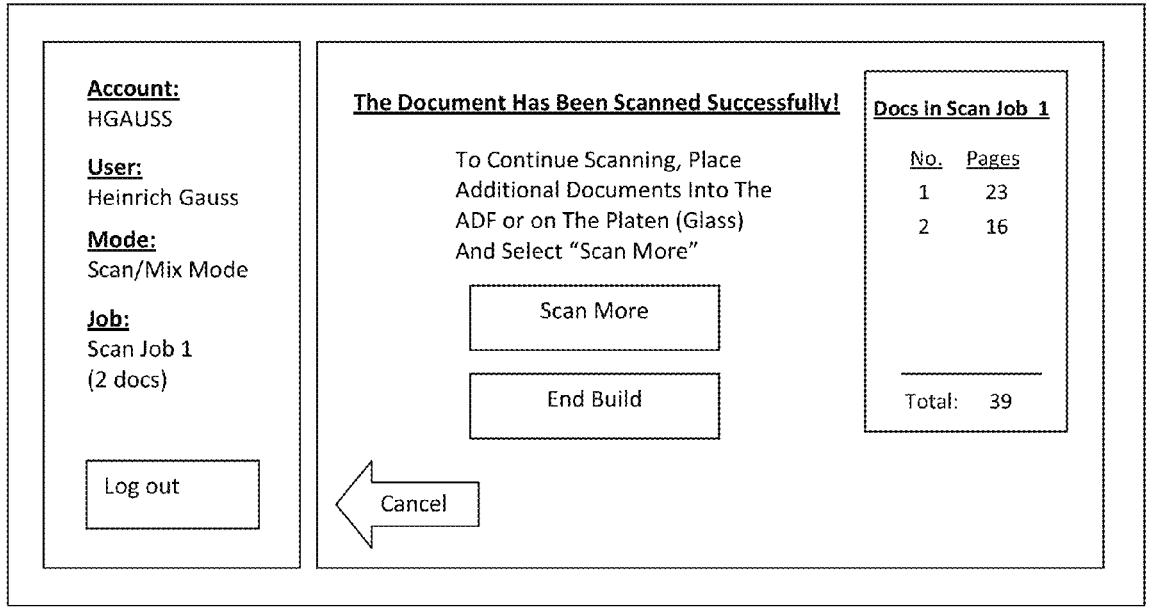

In addition, after the user has scanned the second set of documents, the user is presented with a table containing information about the first document such as the number of pages in the first document, its document number and the total number of pages for this particular mixed mode scan job as shown in FIG. 8G. The document number defines the order that it was scanned. For example, in this case since the first document was scanned first for this particular mixed mode scan job, it is given a document number of "1". Should a second document be scanned, it is given a document number of "2". The table updates itself as more documents are scanned.

Figure 8H:
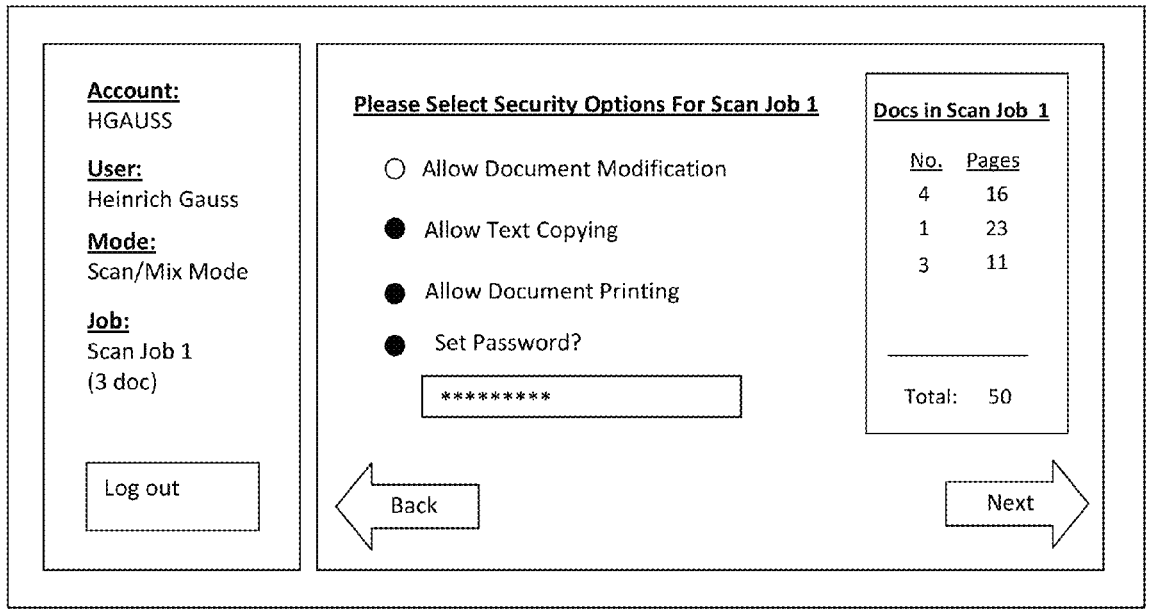

Once the user has confirmed that he or she is finished scanning the documents to be combined into a single output document, the MFP 101 combines the documents previously scanned into a single output document (step S606). Afterwards, the MFP 101 presents the user with security configurations that he or she can place on the output document (step S607) as shown in FIG. 8H. For example, security options such as "Allow Document Modification", "Allow Text Copying" and "Allow Document Printing" are available to the user. If the security option "Allow Document Modification" is not selected, then the output document cannot be changed (i.e. nothing can be added to or deleted from the content of the output document). If the security option "Allow Text Copying" is not selected, a user who is viewing the output document cannot copy text (i.e. characters, numerals, symbols, images, etc.) from the output document. If the security option "Allow Document Printing" is not selected, the user who is viewing the output document cannot send it to any printing device. In addition to the security options the user may also utilize a password for more security in the output document. For example, the user may select all of the security options "Allow Document Modification", "Allow Text Copying" and "Allow Document Printing" and input a password for the output document. Consequently, any recipient who receives the output document needs the password to perform document modification, text copying or document printing. After receiving the security configurations that the user has selected (step S608), the MFP 101 is read to present the user with prompts for a destination to send the output document to.

The flowchart of FIG. 7 illustrates the process performed by the MFP 101 during scanning (FIG. 6, step S605). After the user has selected the configurations, he or she places the document or documents to be scanned onto the ADF (e.g. ADF 202 of FIG. 2) or the glass platen (e.g. glass platen 201 of FIG. 2). The MFP 101 (FIG. 2) then detects whether there are documents on the glass platen 201 or the ADF 202 (step S701). In the case that there are documents on the ADF 202 (step S702, yes), the MFP 101 performs the scan on the documents on the ADF 202 (step S703). As mentioned previously, it is irrelevant if there is a sheet on the glass platen 201 as the documents on the ADF 202 take precedence. Otherwise (step 702, no), MFP 101 performs detection on whether there is a sheet on the glass platen 201 (step S705). In the case that there is a sheet on the glass platen 201 (step S705, yes), the MFP 101 performs the scan on the sheet on the glass platen 201 (step S706). In the case that there is no sheet on the glass platen 202 and no documents on the ADF 202 as established previously (step S705, no), the MFP 101 outputs an error message to the user (step S707). In either case of there being documents on the ADF 202 or a sheet on the glass platen 201 and the MFP 101 has successfully scanned one or the other, the MFP 101 receives instructions on whether to scan additional documents from the ADF 202 or the glass platen 201 (step S704). In the case that the user wishes to scan more documents (step S704, yes), the process repeats itself. Otherwise, the MFP 101 ends the scanning process (step S704, no).

Figure 8I:
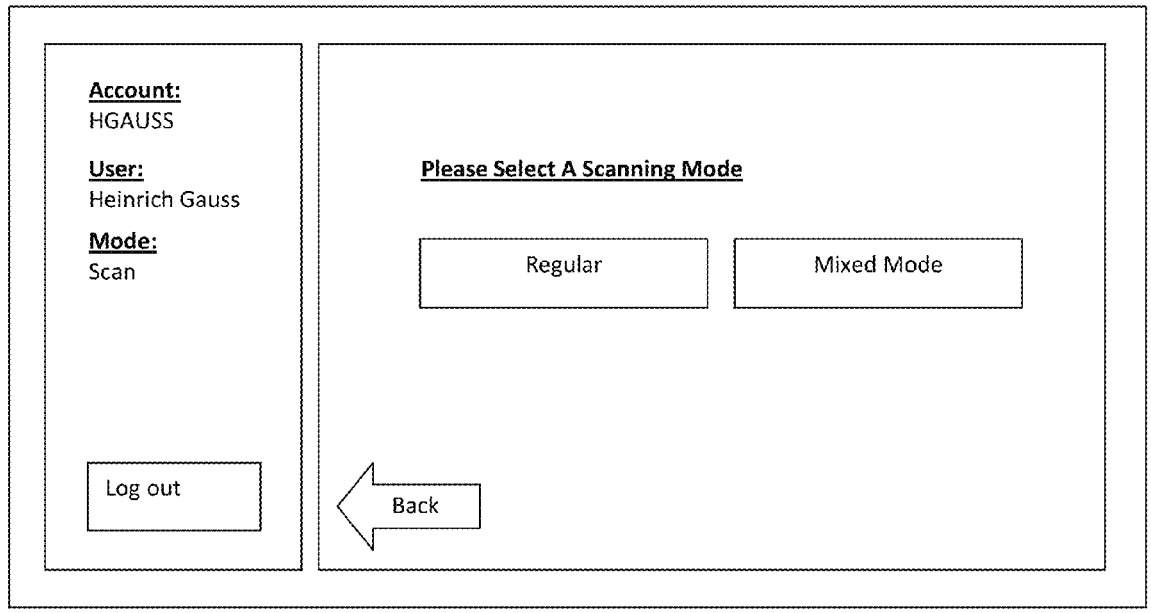

In an exemplary embodiment, instead of a "Job Build" button to initiate the mixed mode scan job build, the MFP 101 may present the user with options for a "regular" scanning mode and a "mixed mode", instead as shown in FIG. 8I. The "regular" scanning mode is the conventional mode of scanning. As for the "mixed mode", the user has the option of scanning and combining multiple documents together with each set of documents having different settings.

Figure 8J:
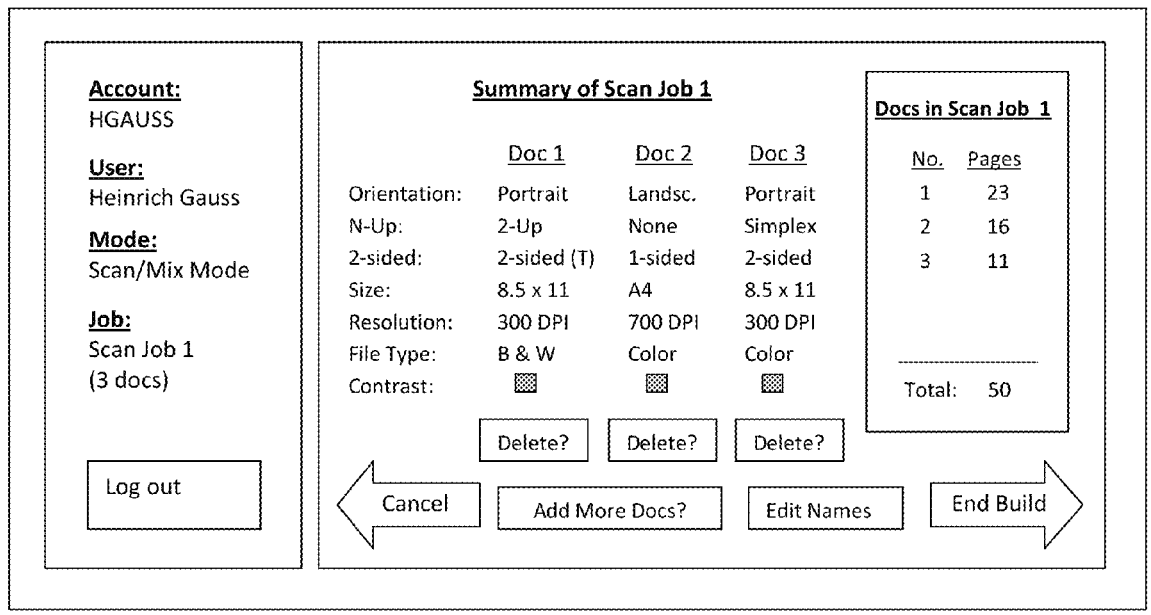

In an another exemplary embodiment, once the user is finished with scanning all of the documents, the MFP 101 may presents to the user with a summary of the scan job as illustrated in FIG. 8J. The summary of the scan job includes information on the documents that have been scanned by the user for this particular mixed mode scan job. Since this mixed mode scan job may be the first in a possible series of mixed mode scan jobs that the user may perform, the summary of scan job is given the identifier "1" (i.e. "Summary of Scan Job 1"). It should be noted that the user may opt to scan and combine another set of documents different from the first particular mixed mode scan job and thus the summary of scan job may be given an identifier that corresponds to the order that the mixed mode scan job was performed (i.e. "2", "3", "4", etc.). This is significant in that it assists the user in tracking down how many mixed mode scan jobs were performed so far. Further, the user is also shown the settings and configurations that the user has selected previously. This is an important feature in that the user has the capability to review the configurations for each document.

For example, as shown, the user "Heinrich" has performed a mixed mode scan job ("scan job 1") and has so far scanned three documents to be combined which are represented by "Doc 1" (first document), "Doc 2" (second document) and "Doc 3" (third document). As clearly seen in the figure, each of the three documents "Doc 1", "Doc2" and "Doc 3" has configurations that are different from each other. Thus, as mentioned before, the scanned documents that are to be combined need not have the same properties or configurations. The resulting output of the mixed mode scan job may be a single document that contains a set of pages that may be vastly different from another set of pages. Further, it is not necessary to perform this process on a terminal. This process of combining documents of different properties or configurations can be performed entirely on the MFP 101.

Figure 8K:
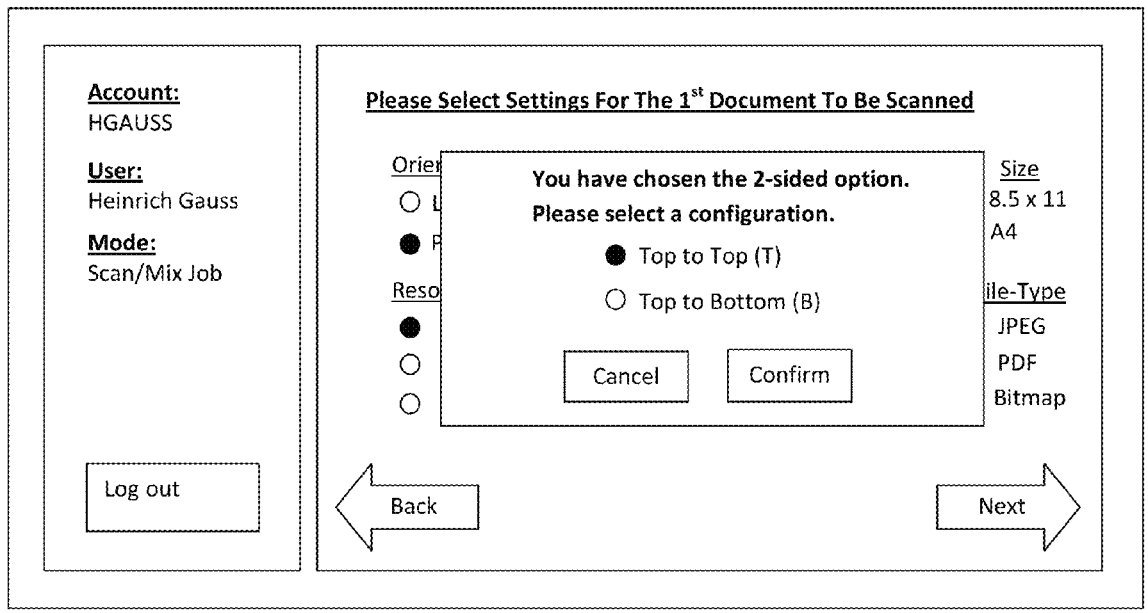

In another exemplary embodiment, the user is allowed the option to adjust the scanning performed when the 2-sided option is selected. For example, when the user selects the "2-sided" radio button, a screen pops up and indicates that the user can scan a document from either a "Top to Top" or "Top to Bottom" configuration as shown in FIG. 8K. The user selects the "Top to Top" configuration when the document to be scanned has content on both sides of the sheet in the same orientation. On the other hand, the user selects the "Top to Bottom" configuration when the document to be scanned has content on both sides of the sheet that are not in the same orientation (i.e. when the user turns the page to read the other side of the document, the user may have to turn the page 180 degrees again to properly read it). After the user has selected one of the options, an identifier "T" corresponding to "Top to Top" or an identifier "B" corresponding to "Top to Bottom" is indicated on the "Summary of Scan Job" screen next to the "2-sided" option. Both configurations, when used appropriately, result in an output in which the first and second sides of the scanned document become consecutive pages that have the same orientation in the output document. This feature is useful in that it allows the user to scan documents that have content printed on two sides to be properly represented in the output document.

In another exemplary embodiment, the user is allowed the option to name each of the documents that have been scanned. The summary of the scan job screen may also contain an "Edit Name" button. This allows the user the option to name each of the documents that have been scanned. For example the user "Heinrich" may currently be working as a project manager at a multinational corporation. He has recently finished with a project that includes building penguin habitats in Africa and has written a report (i.e. the tasks performed, the issues, accomplishments, etc.) to inform his supervisors of its completion as well as other important information. Moreover, he has several photographs of the penguins including their newly built habitats and also raw data (cost estimate, materials, number of workers, etc.) as well. To send the report, photographs and data, "Heinrich" decides to use the MFP 101 located in the multinational corporation's African office.

Figure 8L:
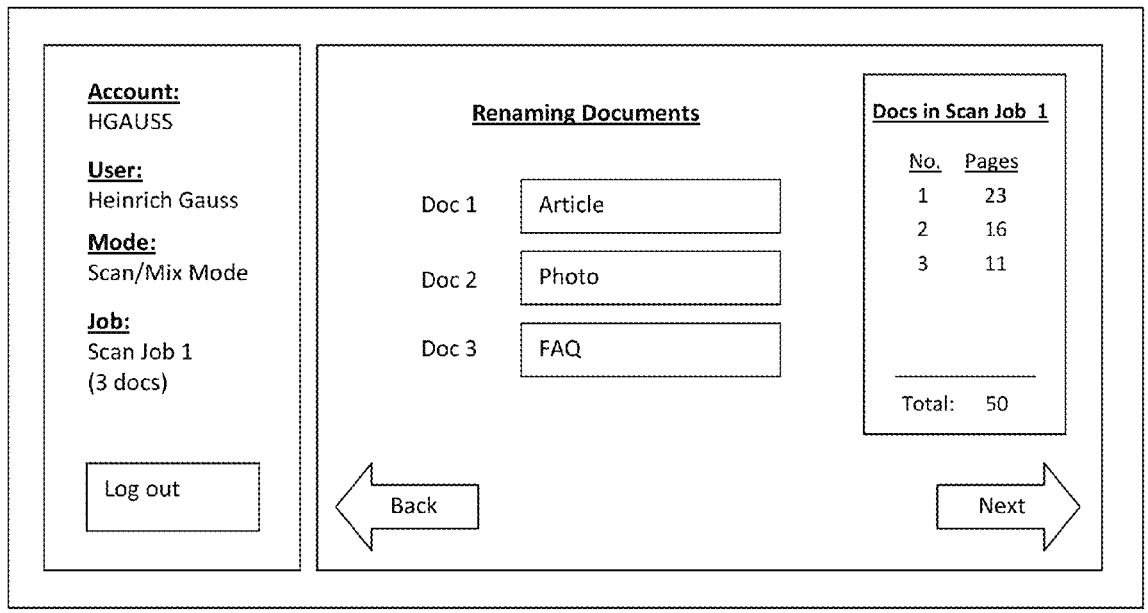

In order to keep track of which documents he has scanned so far, "Heinrich" presses the "Edit Name" button to bring up another screen as illustrated in FIG. 8L and renames "Doc 1" to "Report", "Doc 2" to "Photos" and "Doc 3" to "Data". After he has finished renaming all of the documents, "Heinrich" is presented with and shown an updated "Summary of Scan Job 1" screen as illustrated in FIG. 8M. Also shown, in addition to the change of names, is that each of the new names "Report", "Photos" and "Data" also include numbers that correspond to the document numbers in the table on the right of the screen. For example, "Report" is shown as "Report (1)", "Photos" as "Photos (2)" and "Data" as "Data (3)". The "(1)" in "Report (1)", "(2)" in "Photos (2)" and the "(3)" in "Data (3)" corresponds to document numbers 1, 2 and 3, respectively, in the table. This reason for this is to let the user such as "Heinrich" make a connection between the documents "Report (1)", "Photos (2)" and "Data (3)" to the information in the table.

In an another exemplary embodiment, after viewing the "Summary of Scan Job 1" screen, "Heinrich" might decide that he wants to delete one of the documents. In this case "Heinrich" has selected the document "Photos (2)". After pressing the "Delete" button corresponding to the document "Photos (2)", "Heinrich" is presented with a screen confirming if he still wishes to delete the document "Photos (2)" as shown in FIG. 8N. This is to prevent users from accidentally deleting the documents that they have already scanned. After "Heinrich" has confirmed that he wants the document "Photos (2)" to be deleted, MFP 101 deletes the document "Photos (2)" and "Heinrich" is presented with an updated "Summary of Scan Job 1" screen.

In an another exemplary embodiment, even after "Heinrich" has confirmed previously not to scan any more documents by pressing the "End Build" button as shown in FIG. 8O, he still has another opportunity to scan more documents by pressing the "Add More Docs?" button which is located near the bottom of the "Summary of Scan Job 1" screen. Should "Heinrich" select to scan more documents, he is presented with the screen illustrating the settings and configurations for the scan job as shown previously in FIG. 8D. It should be noted that the process for performing the scan is the same as before with the exception of one additional step. After the MFP 101 has finished scanning the document and before "Heinrich" is shown the screen illustrated previously in FIG. 8J, he is given the option of a location to insert the recently scanned document. As shown in FIG. 8P, he can insert it before a previously scanned document or after the same or another previously scanned document. This is an important feature as it allows users such as "Heinrich" the capability to rearrange the documents.

For example, after "Heinrich" has scanned all of his documents, he remembers that his supervisor wanted the penguin photographs to be arranged in a position before the report and the data. However, in this case, "Heinrich" has already scanned the documents and the penguin photos document which is denoted by "Photos (2)" are arranged in a position after the report document which is denoted by "Report (1)". To remedy this error without performing the mixed mode scan job process all the way from the beginning, "Heinrich" can use the features previously mentioned. First, "Heinrich" may delete the document "Photos (2)" using the delete option on the "Summary of Scan Job 1" screen. Afterwards he can utilize the "Add More Docs?" button on the "Summary of Scan Job 1" screen to scan the previously deleted document containing the photos of the penguins.

Next, after the MFP 101 has scanned the document, "Heinrich" can insert it before the report. As shown previously in FIG. 8P, "Heinrich" performs this insertion by using the pull down tab corresponding to either the "before" option or the "after" option. The pull down tab contains a list of numbers which correspond to both the already scanned documents, such as documents "Report (1)" and "Data (3)", and the table on the right. In this case, "Heinrich" wants to insert the penguin photos document ("Doc 4") before the document "Report (1)". He sees that since the document "Report (1)" has an identifier of "(1)", he should select "1" from the pull down tab corresponding to the "before" option. One the other hand, in the case that the supervisor wanted the photos to be the last document, "Heinrich" would look to the table on the right instead and he would see that the last document corresponds to a document number "3". Consequently, he would select "3" from the pull down tab corresponding to the "after" option. As can be seen the document numbers in the table on the right and the names of the scanned documents are used in assisting the user with insertion of scanned documents.

After "Heinrich" has performed the insertion, the MFP 101, presents to him an updated "Summary of Scan Job 1" screen from which he uses to rename the document "Doc 4" to "Photos". As shown in FIG. 8Q, the penguin photos are now before the report. However, the document "Photos" now contains the identifier "(4)". This is because it is the fourth document to be scanned. Therefore, it should be noted that the numbers included with each document name are identifiers which denote the order that the documents were scanned. Likewise, because the numbers included with each document name correspond to the information in the table on the right, this is also the case for the document numbers in the table on the right. On the other hand, the positions of the document numbers shown in the table on the right signify the order they are arranged when they are outputted as a single document. For example, although the document "Photos (4)" has an identifier of "4" which indicates that the document was the fourth to be scanned, it is at a position at the top of the table before every other document number which indicates that when the scanned documents are outputted as a single output document, the "photo (4)" is at the beginning.

In another exemplary embodiment, the user is presented with the option of creating a file name for the output document as shown in FIG. 8R. The file name is the name that is shown on the output document and is ultimately viewed by the recipients. In addition, the user may also optionally use the default name, in this case "scan job 1", generated for the current scan job as well. Thus, when the user is satisfied with selecting the appropriate file name, the user can now select the destination the output document is to be sent to.

In another exemplary embodiment, the settings for scanning may also contain a configuration for adjusting image density as shown in FIG. 8S. This option allows the user to correct scanning density to improve resolution of paper types such as non-white paper like newspaper or transparent originals. As shown, the user has the option of setting the image density to "100", "500", and "700" pixels per inch (ppi).

Figure 9:
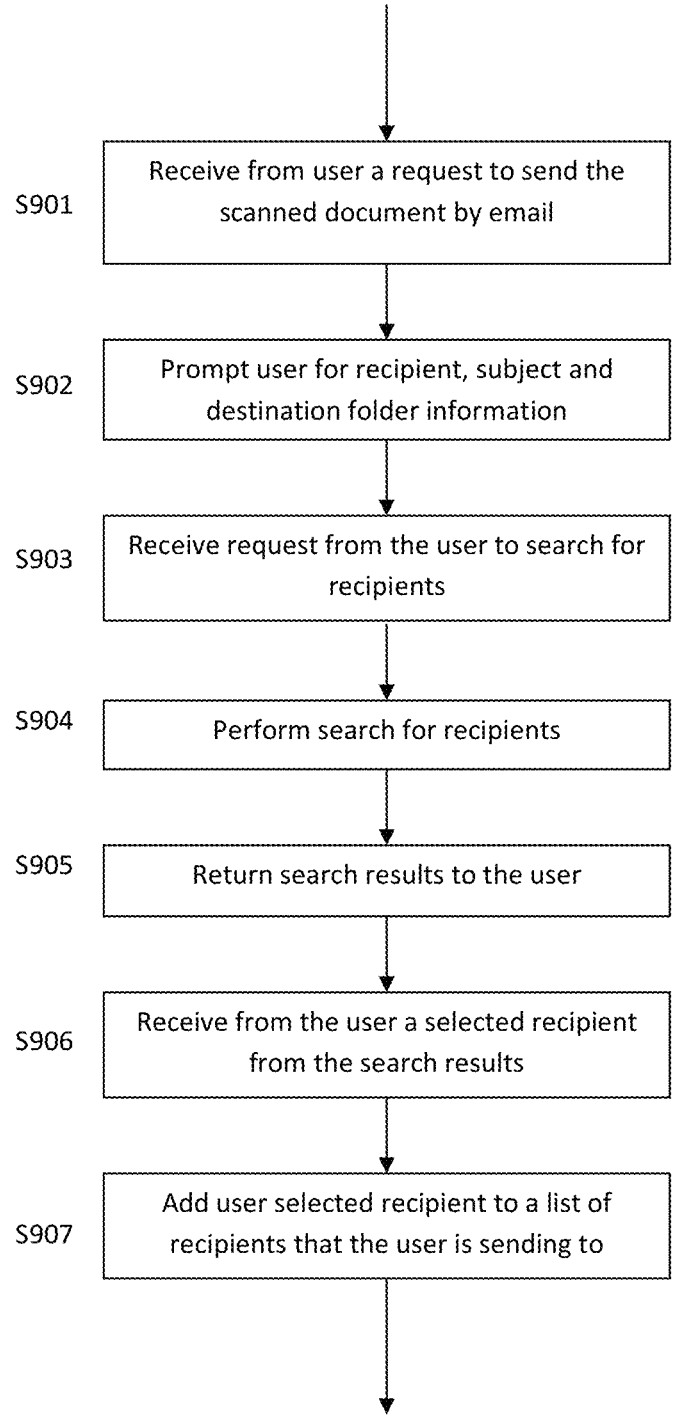
FIG. 9 shows a flow chart of a method performed an apparatus having scanning functionality, to specify one or more destinations of a scan job output.

FIG. 9 shows a process performed by an MFP (e.g., 101), for searching for recipients whom are to receive the output document of the mixed mode scan job to a, according to an exemplary embodiment.

After the user has finished scanning the documents, he or she is prompted by the MFP 101 to select a destination to send the output document to as shown in FIG. 10A. The user has the option of sending the output document to a network storage device, one or more e-mail addresses (including the user's own), or a device currently connected to the MFP 101 (i.e. keydrive). In this case, the user has selected to send the output document by e-mail (step S901). After the MFP 101 has received the selection, the user is presented with a screen as shown in FIG. 10B. The user can perform several tasks on this screen. For example, the user may compile a list of e-mail addresses for the output document to be sent to, search for subject lines to be included in the message, or designate a folder to send the output document (step S902).

Figure 10C:
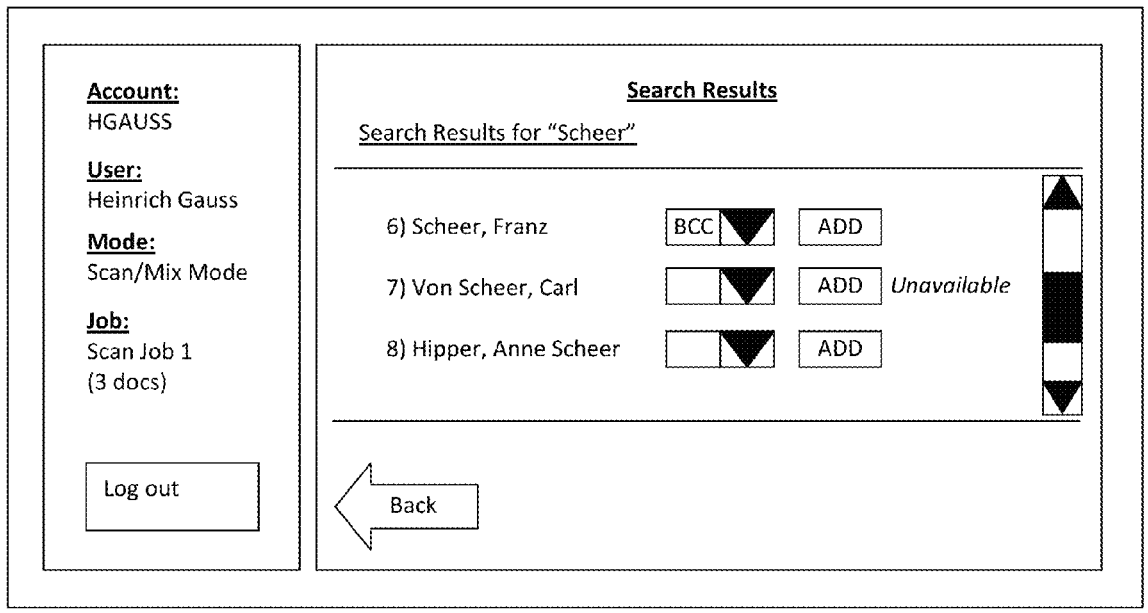

In this case, the user has selected to perform a search for a recipient (step S903). To facilitate this, the user first inputs several characters and then presses the "Search" button. In response, the MFP 101 performs a search using the characters entered by the user (step S904). In this case, the user has selected to search for recipients that contain the characters "Scheer". After performing the search, the MFP 101 presents the search results to the user (step S905) as illustrated in FIG. 10C. In this case, the search results show that the potential recipients whom match the characters "Scheer" are "Scheer, Franz", "Von Scheer, Carl" and "Hipper, Anne Scheer". In addition to selecting a recipient, the user is given the options of designating a prefix of "CC" (carbon copy) or "BCC" (blind carbon copy). The user may attach a prefix of "CC" to a particular recipient in order to indicate that the recipient is to receive a copy of the output document or "BCC" instead in order to prevent other recipients from knowing that the recipients designated with the prefix "BCC" has been sent a copy of the output document. It is also noted that a label "unavailable" is next to the potential recipient "Von Scheer, Carl". This is to denote that the output document cannot be sent to "Von Scheer, Carl". It is possible that there is not enough information about "Von Scheer, Carl" for the user to send the output document to him or it is also possible that the user is not authorized to send any output document to him. After the user has performed the selection by pressing the "Add" button (step S906), the MFP 101 adds the selected recipient to a list on the right (step S907) as previously shown in FIG. 10B.

It should be noted that the when the user types in the characters to perform the search for the recipients, the user is not limited to typing in an e-mail address. Instead he or she may type in an alias name. For example, two recipients may have the similar e-mail addresses which are "GLeopold1@ricoh.com" and "GLeopold2@ricoh.com". Both e-mail addresses belong to a "Georg Leopold" and a "Gunther Leopold", respectively. Although, the user "Heinrich" may know the person that he is sending to which in this case is "Georg Leopold", he may not remember which e-mail address belongs to "Georg Leopold". However, the MFP 101 keeps track of an alias name with a corresponding e-mail address. Thus, for "Heinrich" to send the output document to the right recipient, all he has to do is type in the characters for "Georg Leopold" and the MFP 101 can find the corresponding e-mail address.

It should also be noted that the user can view several pieces of information and perform other tasks on the screen shown in FIG. 10B as well. For example, on the right of the screen, the user is notified that the name shown after "To" is to be name the recipients identify as the sender of the message. Further, below that is the list of recipients that the user intends to the send the output document to along with their corresponding prefixes. Each recipient also contains a label in the form of a number to the left. For example, "Johann Bismarck" has a label of "1" while "Eric@ricoh.com" has a label of "3". These labels indicate the order in which the names of the recipients are to be shown on the e-mail containing the output document. It should be noted that the last eight e-mail entries can be shown, even though an unlimited number of entries can be entered. Moreover, to the right of each recipient is a "Del" button. The "Del" button allows the user to delete the recipients from the list. When a user deletes a recipient, the labels for the recipients are also adjusted. For example, if the user deleted "Marie Schwarz" from the list, the label for "Eric@ricoh.com" would change from "3" to "2". On the other hand, the label for "Johann Bismarck" would remain the same. This is so that the user may adjust the list accordingly when mistakes are made. In addition, the user may also utilize the "Send to Me" button to also send, to his or her e-mail address, the e-mail along with the output document.

Figure 10D:
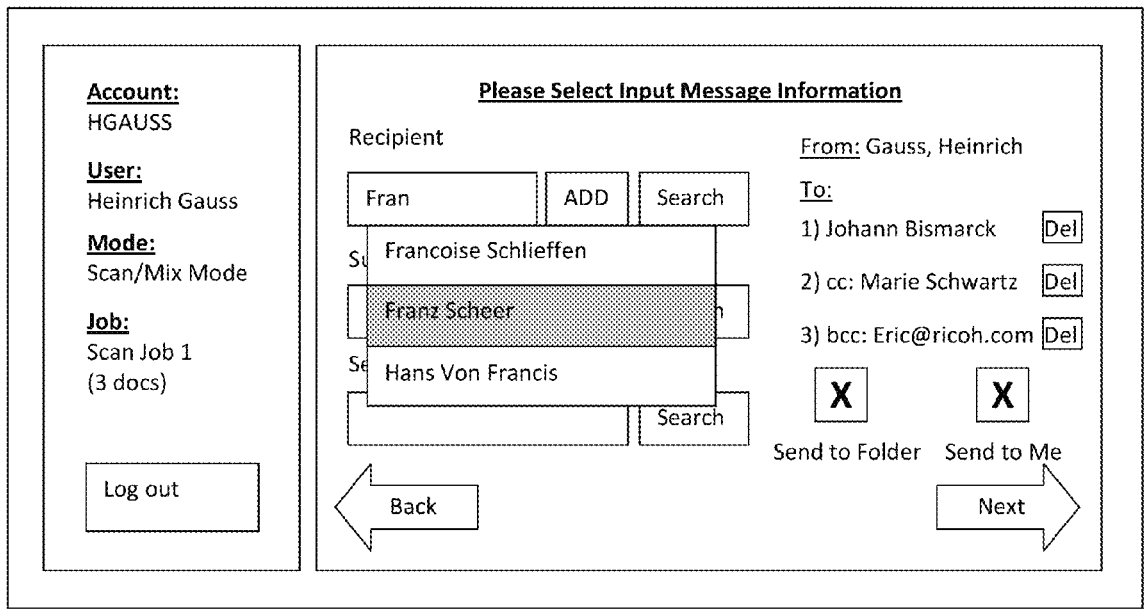

In another exemplary embodiment, the user may also perform a search for recipients whom the user has previously sent an output document to. To facilitate this, the user inputs characters into the search box. As the user types in the characters, an auto-fill function in the MFP 101 suggests to the user one or more e-mail addresses previously used by the user. For example as shown in FIG. 10D, the user has typed in the characters "Fran". Consequently, the auto-fill function brings up a list of recipients containing the characters "Fran" such as "Francoise Schlieffen", "Franz Scheer" and "Hans Von Francis". In addition, if the user terminates the input with the character "@", the auto-fill function may also insert the domain of the destination assuming that the characters matched an e-mail address previously used by the user.

For example, in this case the user has typed "Alfred@" as shown in FIG. 10E. As a result, the auto-fill function brings up a list of recipients containing the characters "Alfred@" such as "Alfred@ricoh-usa.com", "Alfred@ricoh-research.com" and "Alfred@ricoh.com". The user then selects the recipient that he or she wants to send the output document to by pressing the "Add" button. Afterwards, the MFP 101 prompts the user for a selection of a prefix to designate the recipient as shown in FIG. 10F. Accordingly, after the user has made the selection, the recipient and the corresponding prefix is added to the list on the right of the screen. Thus, the user can keep track of the recipients that the user is sending the output document to.

Figure 10G:
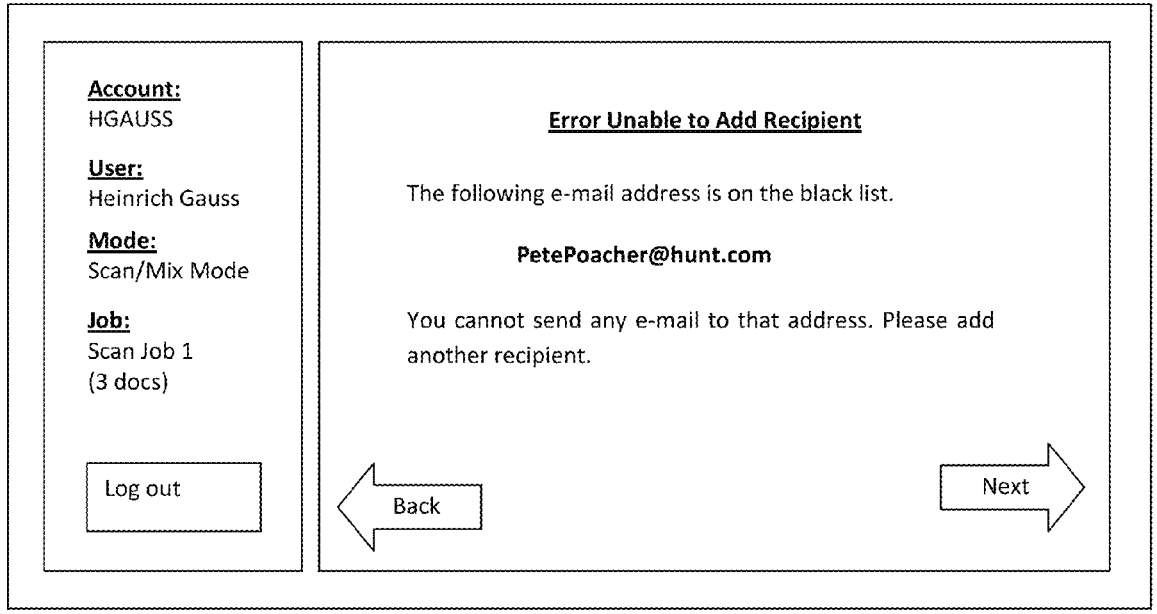
Figure 10H:
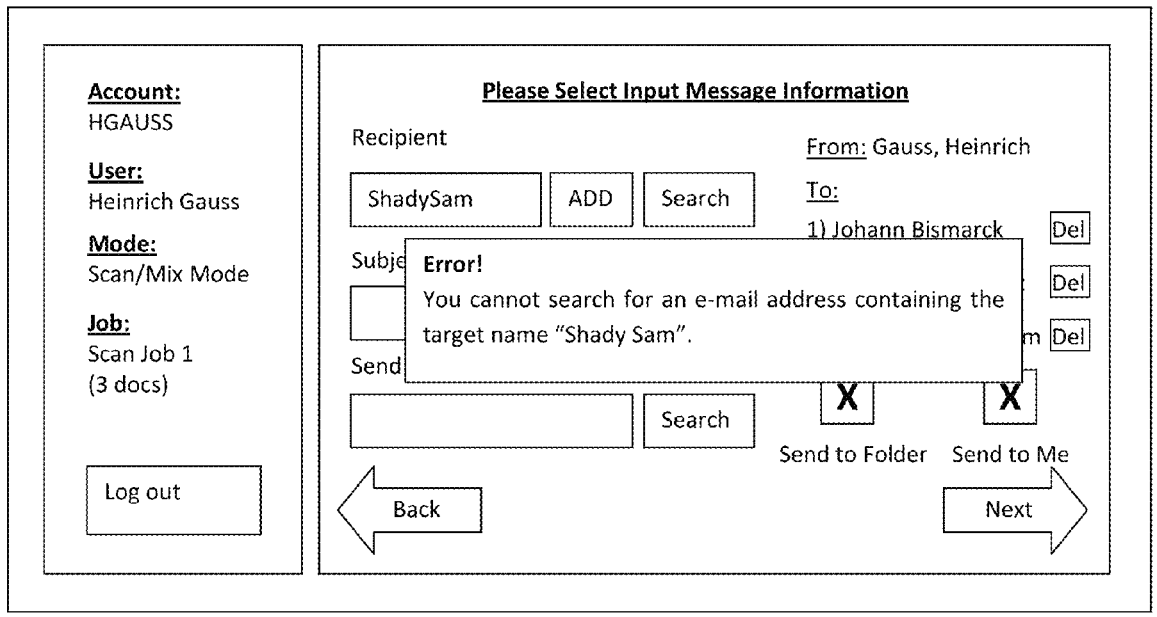

In another exemplary embodiment, the user may not be allowed to send documents to any e-mail address as the output document may contain confidential information. For example a user attempting to add a recipient whose e-mail address is not authenticated and is on a black-list may encounter the screen as shown in FIG. 10G. Further, if the user types in a target name that is on the black-list, the user may be presented with the screen in FIG. 10H, explaining to the user that the he or she cannot send anything to an e-mail address containing the characters of the target name "ShadySam". As a result whenever the user tries to input characters into a search box or add a target name to a list of recipients that is on the black list, the MFP 101 prevents him or her doing so. This provides more security as the confidential output document may be prevented from being sent to unintended recipients. Further, the MFP 101 may also store a white list and a black list as well as shown in FIG. 10I. The recipients on the white list are considered trusted and any e-mail can be send to them. As for the recipients on the black list, they are considered untrustworthy and thus no e-mail can be send to them. Any e-mail that is neither on the white list or the black list may need some type of verification before it can be sent out.

In another exemplary embodiment, the MFP 101 may store information on the recipients that the user has previously sent output documents to. As shown in FIG. 10J, the information includes the e-mail addresses and their corresponding alias names. It should be noted that it is possible that some recipients may have several e-mail addresses corresponding to them. For example, one of the recipients "Alfred Moltke" has several e-mail addresses associated with him. It is possible that "Alfred Molkte" is a researcher at a U.S. division of a company named Ricoh. Consequently, he may have e-mail addresses that correspond to his position as a researcher, his location in America, and his employment at Ricoh. To distinguish between aliases and the various e-mail addresses corresponding to them, the MFP 101 may attach an identifier to each of the aliases. As shown, the alias corresponding to "Alfred@ricoh-usa.com" may be associated with "Alfred Molkte, USA". Thus, this allows the MFP 101 to distinguish between e-mail addresses and their aliases.

Figure 10K:
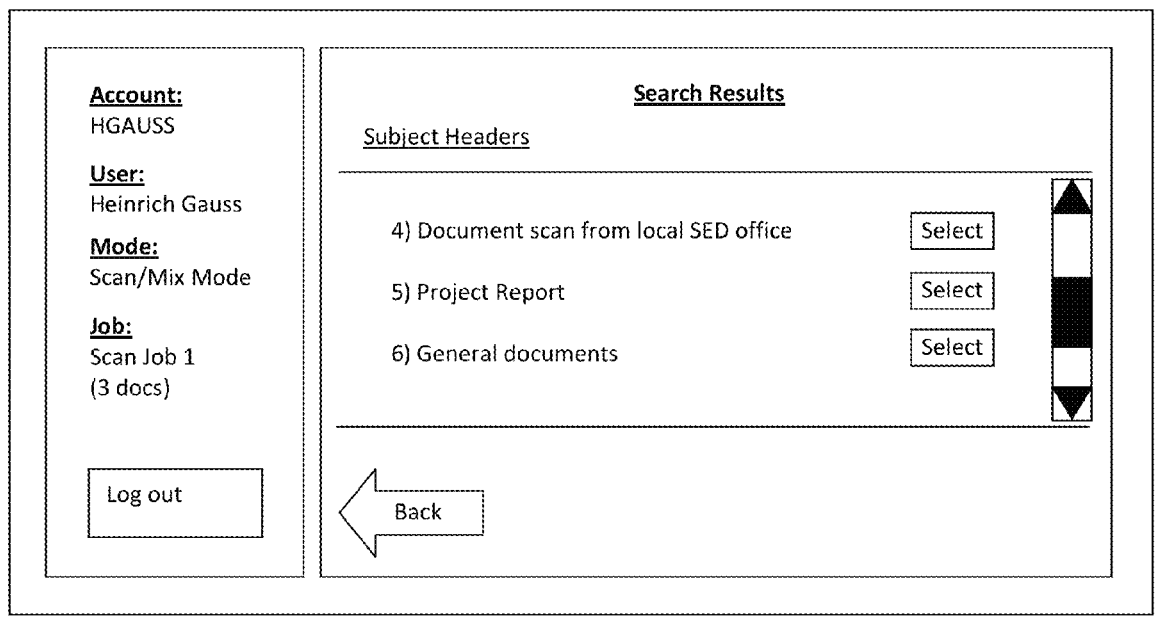

After the user has selected the intended recipients for the output document to be sent to, he or she may then select a subject line to be included within the e-mail. To facilitate this, the user presses the "Search" button under the heading "Subject" as shown previously in FIG. 10B. This brings up a screen containing a list of subject lines that are pre-set by an administrator as illustrated in FIG. 10K. As shown some examples of subject lines are "Documents scan from local SED office", Project Report" and "general documents". The user may scroll through the list and choose an appropriate name for the e-mail. After selecting the subject line, the user presses the "Select" button and the subject line is added to the e-mail. It should be noted that in an exemplary embodiment, the user cannot make his or her own subject line and instead uses the subject lines pre-set by the administrator.

Figure 11:
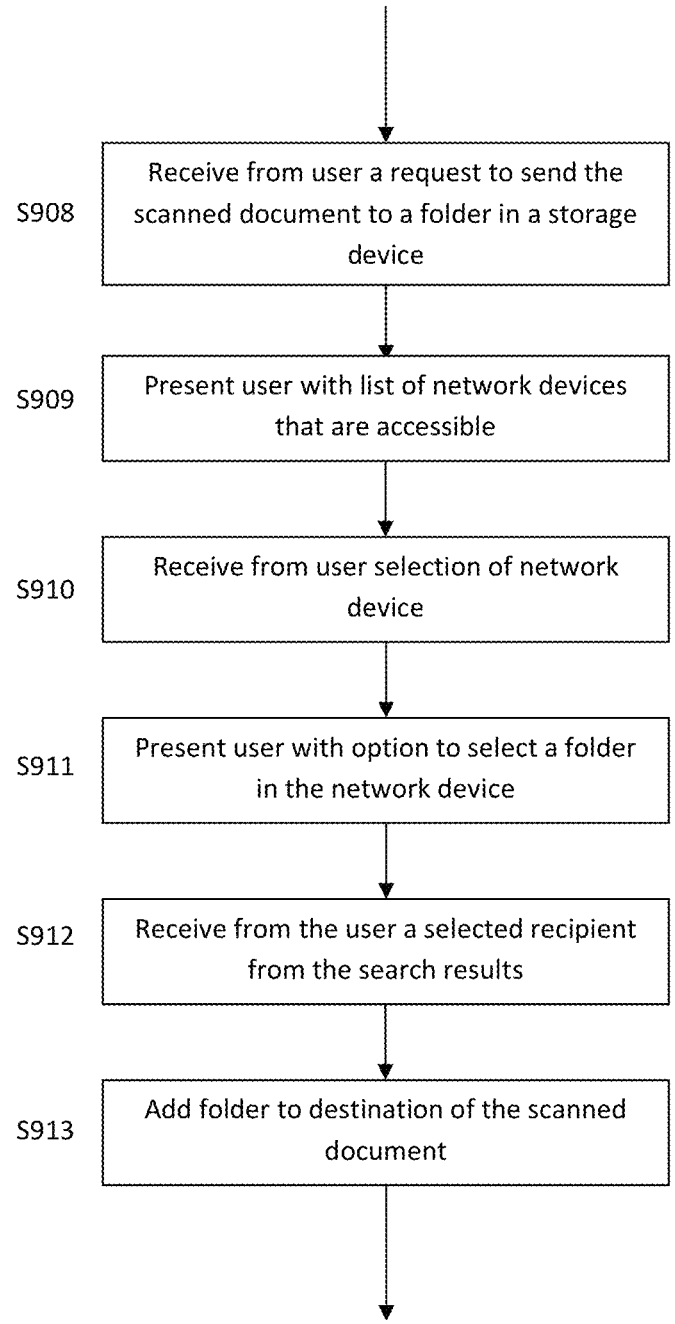
FIG. 11 shows a flow chart of a method performed by an apparatus having scanning functionality, for a user to specify one or more destinations of a scan job output, according to an exemplary embodiment.

FIG. 11 shows a process performed by an MFP (e.g., 101), for selecting a folder for a network storage destination for output document of the mixed mode scan job to be sent to, according to an exemplary embodiment.

Figure 12A:
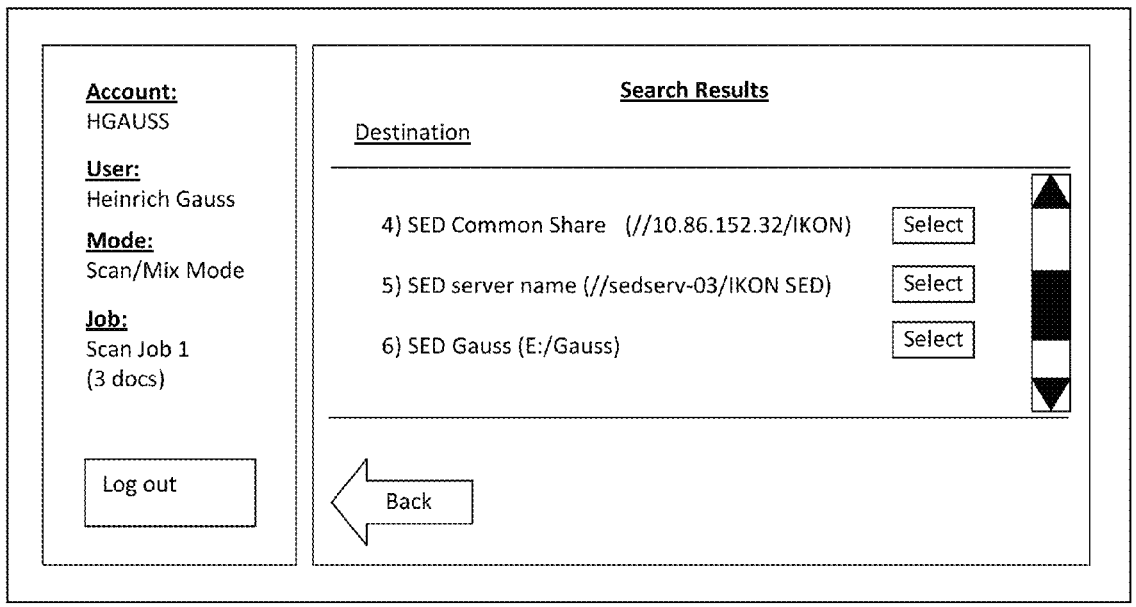

Once the user has selected the intended recipients for the output document to be sent to as well as the subject line, he or she may also wish to send the output document to a folder on a network storage device. To facilitate this, the user may press the "Search" button under the heading "Send to Folder" (step S908). This brings up a screen containing a list of network storage devices currently accessible by the MFP 101 (step S909) as illustrated in FIG. 12A. As shown, the user has access to some network devices including "SED Common share", "SED server name" and "SED Gauss". In this case, the user has selected "SED Gauss" as the network storage device to send the output document to.

Figure 12B:
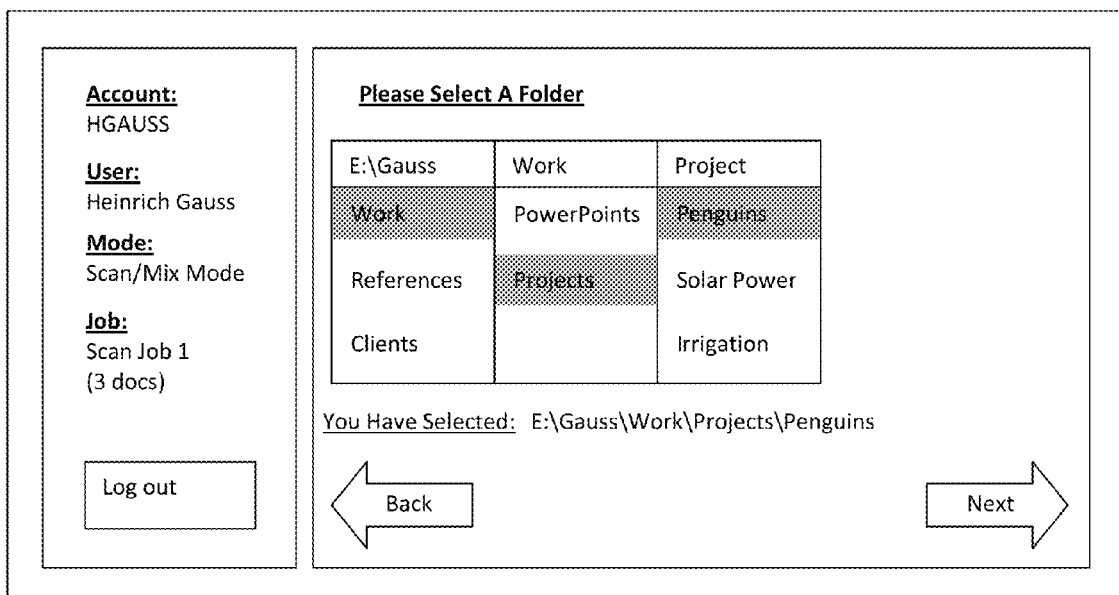

After the MFP 101 receives the selected network storage device from the user (step S910), it presents the user with a screen containing a set of folders that are within "SED Gauss" (step 911) as shown in FIG. 12B. In this case the folders include "Work", "References" and "Clients". The user can expand each of the "Work", "References" and "Clients" folder to access the folders inside them. For example, the user may select the "Work" folder which expands to "Power-Points" and "Projects" folders. In turn, the "Projects" folder can be expanded to "Penguins", "Solar Power" and "Irrigation" folders. It should be noted that the MFP 101 is not limited to allowing the user to select from a specific number of folders. As long as the folders can be expanded, the user is allowed to select any folder he or she wants. In addition, the user is shown the entire file path for each folder selected. For example, in this case, the user has selected "Penguins" as the folder to output the document to. Consequently, on the bottom of the screen, the use is shown the file path "E:\Gauss\Work\Projects\Penguins". This is to inform the user in another way where the output document is to be sent to. After the user has confirmed the selection of the folder that he or she wishes to send the output document to (step 912), the MFP 101 places the folder in the network storage device as a destination (step 913).

When the user has finished with selecting the recipients, the subject line, and, in the case that the user has opt to send the output document to a network storage device, the folder, the MFP 101 outputs a summary as shown in FIG. 12C. This is to allow the user to view the destination (i.e. recipients, folder, his or her e-mail address) one last time before proceeding to send the e-mail. After the user is satisfied, he or she can press the "Next" button to send the e-mail.

It should be noted that the size of the file containing the output document may be exceed the maximum amount that an e-mail can hold. Consequently, the e-mail along with the file may have to be split into two or more parts. For example, a certain e-mail system that the MFP 101 utilizes can have only 15 megabytes (Mb) of data attached. However, a user attempting to send a file containing 35 Mb may find that this is not possible. Accordingly, the MFP 101 asks if the user would like to split the file into two or more parts as shown in FIG. 12D. In the case that the user agrees to do this, the MFP 101 splits the file. In one example, the file size of each part can be determined by the maximum amount that the e-mail can handle. Thus, in this case, the file is split into three parts. The first and second part each has a file size of 15 Mb while the third part has a file size of 5 Mb. When the user sends the file to the recipients, they receive three e-mails in total with each e-mail containing one of each of the three parts of the file.

Figure 12E:
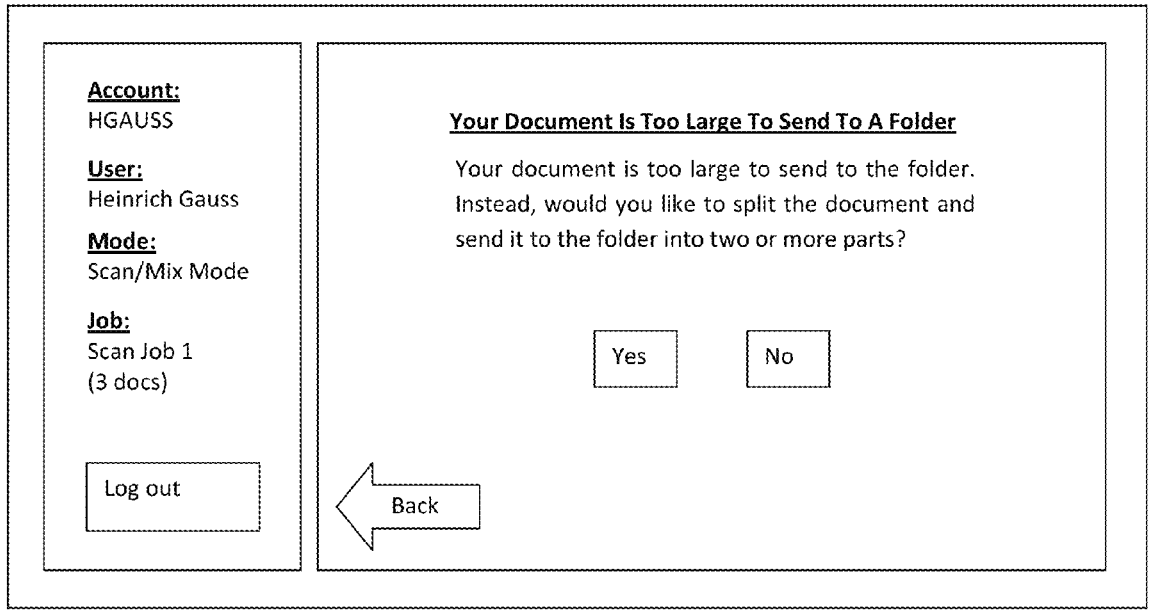

Likewise, it may not be possible for the file to be sent to the folder in a network storage device either since it is too large for the folder. Similar to the process for splitting a file to be sent by e-mail, the user is also prompted by the MFP 101 to perform the split as shown in FIG. 12E. For example, a folder in the network storage device can have a file that has, at most, a size of at most 1 Gb. In this case the file has a size of 2 Gb. Consequently, the file is split into two parts of 1 Gb each.

In an exemplary embodiment, the subject of the e-mail and the file names of the file may also change to reflect the splitting of the file into two or more parts. For example, an e-mail with the originally intended subject line "General documents" may be modified to "General documents—Part 1" and "General documents—Part 2" for the first and second e-mails, respectively. Likewise, a file originally having a file name of "Penguin Projects" may have a file name of "Penguin Projects—Part 1" and "Penguin Projects—Part 2", instead.

Figure 12F:
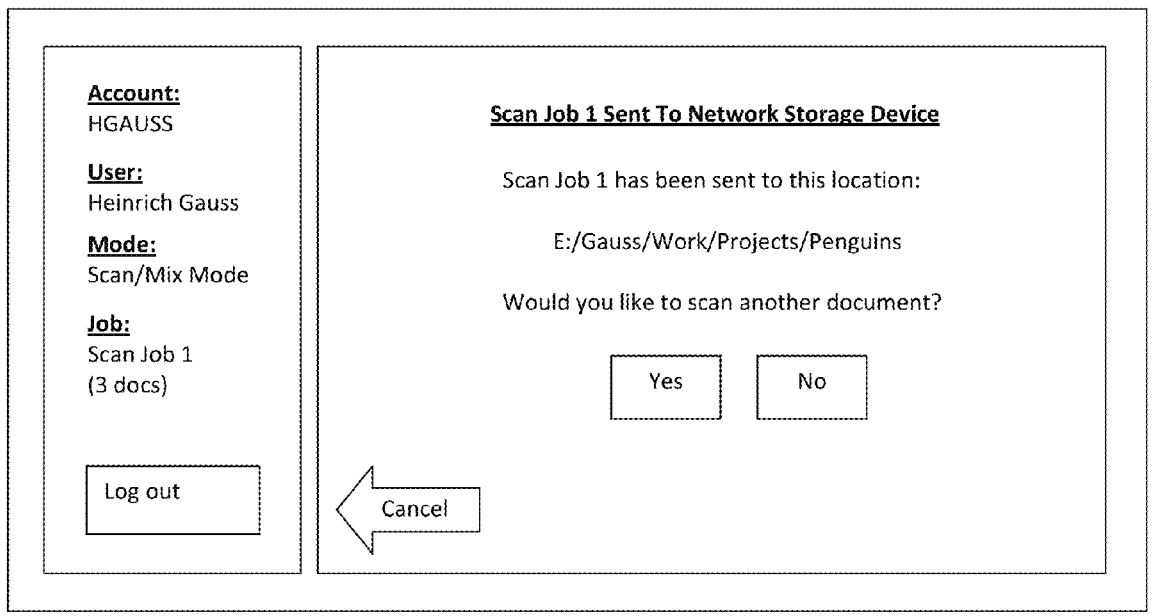

In another exemplary embodiment, the user can also select to send the file to another location instead of to a selection of e-mail addresses. In the case that the user wishes to send the file to a folder or a device connected to the MFP 101 but not by e-mail, the user selects either option as previously shown in FIG. 10A. Then, the user performs the same process as before when the user was selecting a folder to send to in FIG. 9B. After the user has sent the file to the desired location, he or she is receives a summary of the destination as shown in FIG. 12F. In addition the use is also prompted to see if he or she wants to scan another document.

After the user has successfully sent the file containing the output document to the intended destinations, the MFP 101 may create a logging "XML" file to report "file transfers" to a terminal of an administrator as illustrated in FIG. 13A. As shown, the information within the file includes the destination and time that the file was sent and the information on the file sent (i.e. file name, pages). It should be noted that when file is split into smaller parts in order to comply with size requirements in the e-mail system or the folders, the number of parts is also recorded in the logging "XML" file. In addition, the MFP 101 may also use that information to create text file as shown in FIG. 13B.

Figure 14:
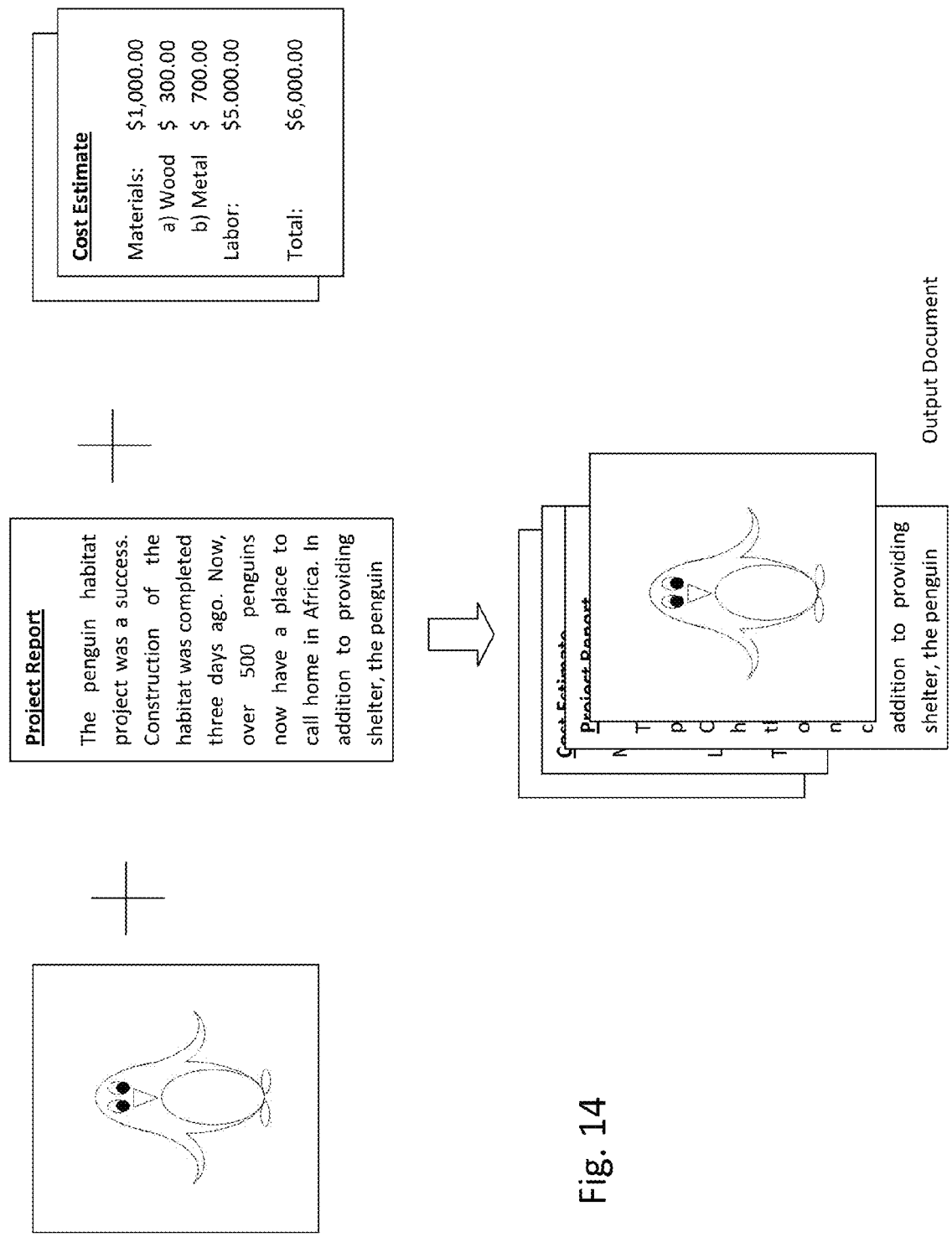
FIG. 14 shows a graphical representation of an output of an apparatus having scanning functionality and configured for a mixed mode scan job build, according to an exemplary embodiment.

FIG. 14 illustrates a graphical representation of how the MFP 101 combines the sheets of documents that have been scanned. As shown, there are three documents which are "Doc 1", "Doc 2" and "Doc 3". These are individual documents with their own set of pages and configurations. For example, as shown in the document "Doc 2", the pages are slightly longer than the pages in the documents "Doc 1" and "Doc 2". The documents are thus combined, resulting in the document "Output Document"

It should be noted that all of these tasks (i.e. scanning, combining, renaming, sending, etc.) can be performed on the MFP 101 or MFP 111 without interaction from any external device.

The orders in which the steps are performed in the aforementioned methods are not limited to those shown in the examples of FIGS. 6, 7, 9 and 11, and may be switched as long as similar results are achieved. Also, it should be noted that the methods illustrated in the examples of FIGS. 6, 7, 9 and 11 may be implemented using any of the systems described in connection with FIG. 3.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A multi-function apparatus comprising automatic document feeder (ADF), an ADF detector to detect whether one or more sheets have been placed in the automatic document feeder, auto-scan provisions to scan an automatically fed document input through the automatic document feeder, a glass platen, manual scan provisions to scan a manually supplied document placed on the glass platen, a processor and a non-transitory medium embodying a program of instructions executable by the processor to configure said multi-function apparatus to additionally comprise:

an output assembly part to assemble an output document, based on job output settings; and a scan job build interface for controlling a mixed mode scan job build, the scan job build interface including a job start part to specify a start of the mixed mode scan job build to trigger a mixed mode job, wherein upon the start of the mixed mode scan job build having been specified, in a case that the ADF detector detects that the one or more sheets are in the ADF, the scan job build interface causes the auto-scan provisions to operate and scan the sheets in the ADF and causes images output by the auto-scan provisions to be included as a beginning of the mixed mode job, and in a case that the ADF detector does not detect any sheets being in the ADF, the scan job build interface causes the manual scan provisions to scan a sheet placed on the glass platen and causes an image output by the manual scan provisions to be included as the beginning of the mixed mode job,
an additional scan interface to request, through a user interface, that an additional sheet be placed in the automatic document feeder or on the glass platen, wherein the additional scan interface includes
(a) a scan more part to specify an instruction to continue the mixed mode scan job build, scan the additional sheet, and cause an image output from the scanning of the additional sheet to be inserted into a position that is before or after previously scanned sheets according to specifications by a user of the user interface, and
(b) an end build part to specify an end of the mixed mode scan job build and that no additional sheets are to be scanned for the mixed mode scan job build,
wherein when the end of the mixed mode scan job build is specified by the end build part, the scan job build interface causes the output assembly part to assemble the output document for the mixed mode job,
wherein the output document based on the mixed mode job includes at least one image output by the auto-scan provisions and an image output by the manual scan provisions, and
wherein the mixed mode job formed in the mixed mode scan job build controlled through the scan job build interface includes one or more images of one page orientation and additional images of a different page orientation.

2. The multi-function apparatus of claim 1, wherein the mixed mode job formed in the mixed mode scan job build controlled through the scan job build interface includes one or more images of one page size and additional images of a different page size.

3. The multi-function apparatus of claim 1, wherein the mixed mode job formed in the mixed mode scan job build controlled through the scan job build interface includes one or more images of one image resolution and additional images of a different image resolution.

4. The multi-function apparatus of claim 1, wherein the mixed mode job formed in the mixed mode scan job build controlled through the scan job build interface includes one or more images of one color mode and additional images of a different color mode.

5. The multi-function apparatus of claim 1, wherein the mixed mode job formed in the mixed mode scan job build controlled through the scan job build interface includes one or more images of one page image density and additional images of a different image density.

6. The multi-function apparatus of claim 1, wherein the mixed mode job formed in the mixed mode scan job build controlled through the scan job build interface includes one or more images of one page contrast and additional images of a different page contrast.

7. The multi-function apparatus of claim 1, wherein the mixed mode job formed in the mixed mode scan job build controlled through the scan job build interface includes one or more images of one page scan mode and additional images of a different page scan mode.

8. The multi-function apparatus of claim 1, wherein the multi-function apparatus configured by the program of instructions further comprises scan-to-email functionalities and a scan destination interface to receive user specification of a user address and activation of send-to-me function to transmit the output document corresponding to the scan job build by the user via the scan-to-email functionalities to the user address.

9. The multi-function apparatus of claim 8, wherein the scan destination interface is further configured to receive user specification of a copy address, separate from the user address, to which the output document corresponding to the scan job build by the user is additionally transmitted.

10. The multi-function apparatus of claim 8, wherein the output settings interface is further configured to receive user specification of a blind copy address, separate from the user address, in connection with transmission of the output document corresponding to the scan job build by the user, and the blind copy address is not indicated in the transmission received by any of the recipients of the output document corresponding to the scan job build by the user.

11. The multi-function apparatus of claim 8, wherein the multi-function apparatus further includes scan-to-folder functionalities, and the scan destination interface is further configured to receive user specification of a network storage folder as a destination, and activation of a send-to-folder function to cause the output document corresponding to the scan job build by the user to be transmitted via the scan-to-folder functionalities to, and stored in, the specified network storage folder.

12. The multi-function apparatus of claim 11, wherein in a case that the send-to-folder function is activated to cause the output document corresponding to the scan job build by the user to be transmitted via the scan-to-folder functionalities to the specified network storage folder, the output document is also automatically transmitted to the user address, unless the send-to-me function is deactivated.

13. The multi-function apparatus of claim 1, wherein the multi-function apparatus configured by the program of instructions further comprises send-to-folder function, scan-to-email functionalities, and a scan destination interface to receive user specification of one or more email destinations, and wherein when the output document corresponding to the scan job build by the user is transmitted via the scan-to-email functionalities to the one or more email destinations, the output document is also automatically transmitted to a user-specified network storage folder, unless the send-to-folder function is deactivated.

14. The multi-function apparatus of claim 1, wherein the multi-function apparatus configured by the program of instructions further comprises scan-to-email functionalities, a scan destination interface to receive user specification of one or more email destinations, and a cache history configured to archive destinations previously specified by the user, and wherein the scan destination interface includes an auto-fill function to suggest, upon user entry of one or more characters of a destination address, one or more archived destinations matching the one or more characters entered by the user.

15. The multi-function apparatus of claim 14, wherein the auto-fill function of the scan destination interface automatically inserts a domain of the destination, in a case that the user-entered characters matching an archived destination is terminated by an "@" symbol.

16. The multi-function apparatus of claim 1, wherein
the multi-function apparatus configured by the program of instructions further comprises scan-to-email functionalities and a scan destination interface to receive user specification of one or more email destinations, and wherein
the scan destination interface further includes an alias function to receive user specification of an alias name in association with a specified destination.

17. The multi-function apparatus of claim 1, wherein
the multi-function apparatus configured by the program of instructions further comprises scan-to-email functionalities and a scan destination interface to receive user specification of one or more email destinations, and wherein the scan destination interface includes an authenticated search function to search for a destination, in a directory of destination candidates, by user entry of one or more characters of a destination address, or one or more characters of the target name associated with the destination.

18. The multi-function apparatus of claim 17, wherein the scan destination interface further includes an exclusion function to receive user specification of one or more portion of the directory of destination candidates to be excluded from the search.

19. The multi-function apparatus of claim 1, wherein the multi-function apparatus configured by the program of instructions further comprises scan-to-email functionalities and a scan destination interface to receive user specification of one or more email destinations, and wherein in a case that a scan-to-email function is to be performed and the output document corresponding to the scan job build by the user exceeds a maximum e-mail size, the scan-to-email functionalities split the output document into multiple files, each file of which does not exceed maximum e-mail size, and transmits the multiple files in respective e-mails to the user-specified destinations.

20. The multi-function apparatus of claim 1, wherein the multi-function apparatus further includes scan-to-folder functionalities, and when a send-to-folder function is activated and the output document corresponding to the scan job build by the user exceeds a maximum file folder size of a network storage folder, the scan-to-folder functionalities split the output document into multiple files, each file of which does not exceed said maximum file folder size, and causes the multiple files to be stored in respective network storage folders.

21. The multi-function apparatus of claim 1, wherein the multi-function apparatus configured by the program of instructions further comprises a secure document control interface to receive user specification, when the output document corresponding to the scan job build by the user is in a portable document format, of a setting to permit changes to the output document in the portable document format, and in the absence of said setting, the output document assembled by the output assembly is in a form in which the output document cannot be modified.

22. The multi-function apparatus of claim 1, wherein the multi-function apparatus configured by the program of instructions further comprises a secure document control interface to receive user specification, when the output document corresponding to the scan job build by the user is in a portable document format, of a setting to permit text copying from the output document in the portable document format, and in the absence of said setting, the output document assembled by the output assembly is in a form from which text copying cannot be performed.

23. The multi-function apparatus of claim 1, wherein the multi-function apparatus configured by the program of instructions further comprises a secure document control interface to receive user specification, when the output document corresponding to the scan job build by the user is in a portable document format, of a setting to permit text copying from the output document in the portable document format, and in the absence of said setting, the output document assembled by the output assembly is in a form that cannot be printed.

24. A job build application including one or more programs of instructions embodied in a non-transitory computer readable medium and executable by a processor of a multi-function apparatus that further comprises an automatic document feeder (ADF), an ADF detector to detect whether one or more sheets have been placed in the automatic document feeder, auto-scan provisions to scan an automatically fed document input through the automatic document feeder, a glass platen, and manual scan provisions to scan a manually supplied document placed on the glass platen, wherein the job build application executable by the processor of the multi-function apparatus comprises:

an output assembly part to assemble an output document, based on job output settings; and a scan job build interface for controlling a mixed mode scan job build, the scan job build interface including a job start part to specify a start of the mixed mode scan job build to trigger a mixed mode job, wherein upon the start of the mixed mode scan job build having been specified, in a case that the ADF detector detects that the one or more sheets are in the ADF, the scan job build interface causes the auto-scan provisions to operate and scan the sheets in the ADF and causes images output by the auto-scan provisions to be included as a beginning of the mixed mode job, and in a case that the ADF detector does not detect any sheets being in the ADF, the scan job build interface causes the manual scan provisions to scan a sheet placed on the glass platen and causes an image output by the manual scan provisions to be included as the beginning of the mixed mode job, an additional scan interface to request that an additional sheet be placed in the automatic document feeder or on the glass platen, wherein the additional scan interface includes (a) a scan more part to specify an instruction to continue the mixed mode scan job build, scan the additional sheet, and cause an image output from the scanning of the additional sheet to be appended to the mixed mode job, and (b) an end build part to specify an end of the mixed mode scan job build and that no additional sheets are to be scanned for the mixed mode scan job build, wherein when the end of the mixed mode scan job build is specified by the end build part, the scan job build interface causes the output assembly part to assemble the output document for the mixed mode job, wherein the output document based on the mixed mode job includes at least one image output by the auto-scan provisions and an image output by the manual scan provisions, and wherein when the end of the mixed mode scan job build is specified by the end build part, the scan job build interface presents a summary of the sheets scanned in the mixed mode job that includes the configurations and settings used to scan each of the sheets in the output document based on the mixed mode job.

25. A method for controlling a mixed mode scan job build in a multi-function apparatus comprising an automatic document feeder (ADF), an ADF detector to detect whether one or more sheets have been placed in the automatic document feeder, auto-scan provisions to scan an automatically fed document input through the automatic document feeder, a glass platen, manual scan provisions to scan a manually supplied document placed on the glass platen, the method comprising:

(a) providing a build job interface including a job start part to specify a start of the mixed mode scan job build, and when the start of the mixed mode scan job build is specified by the job start part,
  - (a1) in a case that the ADF detector detects that the one or more sheets are in the ADF, causing the auto-scan provisions to operate and scan the sheets in the ADF and causing images output by the auto-scan provisions to be included as a beginning of the mixed mode job, and
  - (a2) in a case that the ADF detector does not detect any sheets being in the ADF, causing the manual scan provisions to scan a sheet placed on the glass platen and causing an image output by the manual scan provisions to be included as the beginning of the mixed mode job;
- (b) outputting through a user interface a request for an additional sheet to be placed in the automatic document feeder or on the glass platen;
- (c) providing an additional scan interface including
  - (c1) a scan more part to specify an instruction to continue the mixed mode scan job build, scan the additional sheet, and cause an image output from the scanning of the additional sheet to be inserted into a position that is before or after previously scanned sheets according to specifications by a user of the user interface, and
  - (c2) an end build part to specify an end of the mixed mode scan job build and that no additional sheets are to be scanned for the mixed mode scan job build; and
- (d) causing an output assembly part to assemble an output document, based on job output settings, for the mixed mode job, when the end of the mixed mode scan job build is specified by the end build part, wherein the output document based on the mixed mode job includes at least one image output by the auto-scan provisions and an image output by the manual scan provisions.

* * * * *